(12) United States Patent
Bodoin

(10) Patent No.: US 12,027,691 B2
(45) Date of Patent: Jul. 2, 2024

(54) VERTICALLY INTEGRATED PURE LITHIUM METAL PRODUCTION AND LITHIUM BATTERY PRODUCTION

(71) Applicant: Pure Lithium Corporation, Long Island, NY (US)

(72) Inventor: Emilie Bodoin, Long Island, NY (US)

(73) Assignee: PURE LITHIUM CORPORATION, Long Island, NY (US)

( * ) Notice: Subject to any disclaimer, the term of this patent is extended or adjusted under 35 U.S.C. 154(b) by 224 days.

(21) Appl. No.: 17/006,073

(22) Filed: Aug. 28, 2020

(65) Prior Publication Data
US 2022/0069278 A1 Mar. 3, 2022

(51) Int. Cl.
H01M 4/04 (2006.01)
C25C 1/02 (2006.01)
(Continued)

(52) U.S. Cl.
CPC ............. H01M 4/0452 (2013.01); C25C 1/02 (2013.01); C25D 7/06 (2013.01); H01M 4/0438 (2013.01);
(Continued)

(58) Field of Classification Search
CPC .. H01M 4/0452; H01M 4/0438; H01M 4/134; H01M 4/1395; H01M 4/382;
(Continued)

(56) References Cited

U.S. PATENT DOCUMENTS 3,953,234 A * 4/1976 Hoffmann ................ C25C 1/02
205/234
4,009,052 A 2/1977 Whittingham
(Continued)

FOREIGN PATENT DOCUMENTS

CN 110474053 A 11/2019
EP 3547416 A1 10/2019
(Continued)

OTHER PUBLICATIONS

Choudhury et al., "A Highly Reversible Room-Temperature Lithium Metal Battery Based on Crosslinked Hairy Nanoparticles", Nature Communications, Dec. 2015, 9 pages.
(Continued)

*Primary Examiner* — Milton I Cano
*Assistant Examiner* — Joshua P McClure
(74) *Attorney, Agent, or Firm* — Wilson Sonsini Goodrich & Rosati

(57) ABSTRACT

Methods are proposed for fabricating highly pure lithium metal electrodes from aqueous lithium salt solutions. Electrolysis is performed through lithium ion selective membranes, with constant current densities between about 10 mA/cm$^2$ and about 50 mA/cm$^2$ being applied for a time between about 1 minute and about 60 minutes. The electrolysis is performed under a blanketing atmosphere, the blanketing atmosphere being substantially free of lithium reactive components. Methods are further proposed for vertically integrating the electrolytic fabrication of highly pure lithium metal electrodes into the production of lithium metal batteries, the fabrication of lithium electrodes and lithium metal batteries being performed in a single facility.

16 Claims, 13 Drawing Sheets

(51) Int. Cl.
| | |
|---|---|
| C25D 7/06 | (2006.01) |
| H01M 4/134 | (2010.01) |
| H01M 4/1395 | (2010.01) |
| H01M 4/38 | (2006.01) |
| H01M 10/052 | (2010.01) |
| H01M 10/0585 | (2010.01) |
| C25D 7/00 | (2006.01) |
| H01M 4/02 | (2006.01) |

(52) U.S. Cl.
CPC ......... *H01M 4/134* (2013.01); *H01M 4/1395* (2013.01); *H01M 4/382* (2013.01); *H01M 10/052* (2013.01); *H01M 10/0585* (2013.01); *C25D 7/006* (2013.01); *H01M 2004/027* (2013.01)

(58) Field of Classification Search
CPC ......... H01M 2004/027; H01M 10/052; H01M 10/0585; C25C 1/02; C25C 7/00; C25D 7/006; C25D 7/06; Y02P 70/50
See application file for complete search history.

(56) References Cited

U.S. PATENT DOCUMENTS

| | | |
|---|---|---|
| 4,405,416 A | 9/1983 | Raistrick et al. |
| 4,546,055 A | 10/1985 | Coetzer et al. |
| 4,781,756 A | 11/1988 | Frianeza-Kullberg et al. |
| 8,999,571 B2 | 4/2015 | Chiang et al. |
| 9,048,507 B2 | 6/2015 | Eitouni et al. |
| 9,705,167 B2 | 7/2017 | Khiterer et al. |
| 10,074,839 B2 | 9/2018 | Hammond-Cunningham et al. |
| 10,090,564 B2 | 10/2018 | Chung et al. |
| 10,177,366 B2 | 1/2019 | Swonger et al. |
| 11,251,430 B2 | 2/2022 | Siu et al. |
| 11,453,948 B2 | 9/2022 | Gallant et al. |
| 11,588,146 B2 | 2/2023 | Bodoin |
| 2013/0236764 A1 | 9/2013 | Hu et al. |
| 2015/0014184 A1 | 1/2015 | Swonger |
| 2016/0351889 A1* | 12/2016 | Swonger ........... H01M 10/0525 |
| 2017/0271639 A1* | 9/2017 | Yoshima ............... H01M 50/46 |
| 2018/0097221 A1 | 4/2018 | Swonger et al. |
| 2018/0198170 A1 | 7/2018 | Fujita et al. |
| 2018/0371632 A1 | 12/2018 | Bodoin et al. |
| 2019/0036165 A1 | 1/2019 | Zhamu et al. |
| 2019/0048483 A1 | 2/2019 | Swonger et al. |
| 2019/0051885 A1 | 2/2019 | Swonger et al. |
| 2019/0194373 A1 | 6/2019 | Ma et al. |
| 2019/0226108 A1 | 7/2019 | Swonger |
| 2019/0273258 A1* | 9/2019 | Thomas-Alyea ... H01M 50/491 |
| 2019/0348668 A1 | 11/2019 | Kim et al. |
| 2020/0002153 A1 | 1/2020 | Delmas et al. |
| 2020/0086281 A1 | 3/2020 | Hryn et al. |
| 2020/0087806 A1* | 3/2020 | Hryn ........................ C25C 1/02 |
| 2020/0091509 A1 | 3/2020 | Hyrn et al. |
| 2020/0136178 A1 | 4/2020 | Ku et al. |
| 2020/0149174 A1 | 5/2020 | Swonger |
| 2020/0203705 A1 | 6/2020 | Swonger et al. |
| 2021/0091433 A1 | 3/2021 | Hammond et al. |
| 2021/0336274 A1 | 10/2021 | Jung et al. |
| 2021/0381115 A1 | 12/2021 | Kang et al. |
| 2022/0069282 A1 | 3/2022 | Bodoin |
| 2022/0166021 A1 | 5/2022 | Siu et al. |
| 2022/0246901 A1 | 8/2022 | Sadoway |
| 2022/0255057 A1 | 8/2022 | Sadoway |
| 2022/0367849 A1 | 11/2022 | Sadoway et al. |
| 2022/0367874 A1 | 11/2022 | Sadoway et al. |
| 2022/0393173 A1 | 12/2022 | Sadoway et al. |
| 2022/0393234 A1 | 12/2022 | Sadoway et al. |
| 2023/0102679 A1 | 3/2023 | Sadoway et al. |
| 2023/0207779 A1 | 6/2023 | Bodoin |
| 2023/0395779 A1 | 12/2023 | Bodoin |

FOREIGN PATENT DOCUMENTS

| | | | |
|---|---|---|---|
| WO | WO-9816960 A2 | 4/1998 | |
| WO | WO-0005774 A1 | 2/2000 | |
| WO | WO-2019018386 A1 * | 1/2019 | ........... C23C 16/345 |
| WO | WO-2022046327 A1 | 3/2022 | |
| WO | WO-2022046328 A1 | 3/2022 | |
| WO | WO-2022173578 A1 | 8/2022 | |
| WO | WO-2022240696 A1 | 11/2022 | |
| WO | WO-2022240768 A1 | 11/2022 | |
| WO | WO-2022256685 A1 | 12/2022 | |
| WO | WO-2022256692 A1 | 12/2022 | |
| WO | WO-2023049353 A2 | 3/2023 | |

OTHER PUBLICATIONS

Choudhury et al., "Electroless Formation of Hybrid Lithium Anodes for Fast Interfacial Ion Transport", Agnew. Chem. Int. Ed. 2017, vol. 56, pp. 13070-13077.
Choudhury et al. ,"Designer Interphases for the Lithium-Oxygen Electrochemical Cell", Sci. Adv., Apr. 19, 2017, 11 pages.
Zhao et al., "Solid-State Polymer Electrolytes with In-Built Fast Interfacial Transport for Secondary Lithium Batteries", Nature Energy, vol. 4, May 2019, pp. 365-373.
Gannett et al., "Cross-Linking Effects on Performance Metrics of Phenazine-Based Polymer Cathodes", ChemSusChem, 2020, vol. 13, pp. 2428-2435.
Stalin et al., "Designing Polymeric Interphases for Stable Lithium Metal Deposition", American Chemical Society, Jun. 1, 2020, 10 pages.
Harry et al., "Detection of Subsurface Structures Underneath Dendrites Formed on Cycled Lithium Metal Electrodes", Nature materials, vol. 13, Jan. 2014, pp. 69-73.
Qian et al. "Dendrite-Free Li Deposition Using Trace-Amounts of Water as an Electrolyte Additive", Nano Energy, 2015, vol. 15, pp. 135-144.
Mashtalir et al., "High-Purity Lithium Metal Films from Aqueous Mineral Solutions", ACS Omega, 2018, vol. 3, pp. 181-187.
Lee et al. "Dendrite-Free Lithium Deposition for Lithium Metal Anodes with Interconnected Microsphere Protection", Chem. Mater., Jul. 2017, vol. 29, pp. 5906-5914.
Nakajima et al., "Lithium Ion Conductive Glass Ceramics: Properties and Application in Lithium Metal Batteries", Symposium on Energy Storage Beyond Lithium Ion, Oak Ridge National Laboratory, pp. 1-28, Oct. 8, 2010.
Mashtalir et al., "High-Purity Lithium Metal Films from Aqueous Mineral Solutions", ACS Omega, vol. 3, pp. 181-187, Jan. 8, 2018.
International Searching Authority—International Search Report, pertaining to International Application No. PCT/US2021/042696, dated Nov. 5, 2021, together with the Written Opinion of the International Searching Authority, 17 pages.
U.S. Appl. No. 18/236,257 Office Action dated Oct. 23, 2023.
Co-pending U.S. Appl. No. 18/095,844, inventors Sadoway; Donald R. et al., filed on Jan. 11, 2023.
Co-pending U.S. Appl. No. 18/236,257, inventor Bodoin; Emilie, filed on Aug. 21, 2023.
Pan et al., "A review of solid-slate lithium-sulfur battery: Ion transport and polysulfide chemistry," Energy Fuels, vol. 34, pp. 11942-11961, Sept. 3, 2020.
PCT/US2021/042694 International Search Report and Written Opinion dated Nov. 4, 2021.
PCT/US2022/028179 International Search Report and Written Opinion dated Sep. 5, 2022.
PCT/US2022/028380 International Search Report and Written Opinion dated Sep. 12, 2022.
PCT/US2022/032209 International Search Report and Written Opinion dated Oct. 14, 2022.
Shi, et al. The Development of Vanadyl Phosphate Cathode Materials for Energy Storage Systems: A Review. Chemistry. Jul. 2, 2020;26(37):8190-8204. doi: 10.1002/chem.201905706. Epub May 11, 2020.
Sigma-Aldrich. Certificate of Analysis. Product Name: Lithium-ribbon, thickness x W 0.38 mm x 23 mm, 99.9% trace metals basis.

(56) References Cited

OTHER PUBLICATIONS

Product No. 265985. Batch No. SHBM9629. Quality Release Date Jan. 22, 2021. Retrieved online Jul. 23, 2023 at URL: https://www.sigmaaldrich.com/certificates/COFA/26/265985/265985-BULK_SHBM9629_.pdf.

SIGMA-ALDRICH. Product Specification Sheet. Product Name: Lithium - ribbon, thickness x W 0.38 mm x 23 mm, 99.9% trace metals basis. Product No. 265985. Retrieved online Jul. 23, 2023 at URL: https://www.sigmaaldrich.com/specification-sheets/221/584/265985-BULK_ALDRICH_.pdf.

Siu, et al. Enabling multi-electron reaction of $\epsilon$-VOPO4 to reach theoretical capacity for lithium-ion batteries. Chem Commun (Camb). Jul. 10, 2018;54(56):7802-7805. doi: 10.1039/c8cc02386g.

Trapa et al., "Block copolymer electrolytes synthesized by atom transfer radical polymerization for solid-slate, thin-film lithium batteries," Electrochemical and Solid State Letters, vol. 5, pp. A85-A88, Feb. 26, 2002.

U.S. Appl. No. 17/006,048 Notice of Allowance dated Nov. 3, 2022.

U.S. Appl. No. 17/006,048 Office Action dated Apr. 7, 2022.

Whittingham, et al. Can Multielectron Intercalation Reactions Be the Basis of Next Generation Batteries? Acc Chem Res. Feb. 20, 2018;51(2):258-264. doi: 10.1021/acs.accounts.7b00527. Epub Jan. 12, 2018.

Zhang, et al. Pushing the limit of 3d transition metal-based layered oxides that use both cation and anion redox for energy storage. Nat Rev Mater 7, 522-540 (2022). https://doi.org/10.1038/s41578-022-00416-1.

\* cited by examiner

VERTICALLY INTEGRATED PURE LITHIUM METAL PRODUCTION AND LITHIUM BATTERY PRODUCTION

CROSS-REFERENCE TO RELATED APPLICATIONS

Related application filed on the same date as the present application and having the same inventor and same assignee as the present application, entitled "Lithium Metal Anode and Battery" and having assigned application Ser. No. 17/006,048 is hereby incorporated by reference.

TECHNICAL FIELD

The present invention relates to the production of highly pure lithium for use in lithium metal batteries, and the integration of lithium metal production with the production of Li batteries. The resultant batteries are manufactured in a fully charged state, and have increased cycle life compared to conventional manufacturing methods.

BACKGROUND ART

Lithium ion batteries (LIBs) dominate the lithium battery market. LIBs contain lithium which is only present in an ionic form. Such batteries have good charging density and can function effectively through multiple charge/discharge cycles. Lithium metal batteries (LMBs) by contrast, use non-ionic lithium metal at the negative electrode. During discharge of an LMB, lithium ions are released from this electrode, as electrons flow through an external circuit. As the LMB recharges, lithium ions are reduced back to lithium metal as electrons flow back into the negative electrode. Because LMBs have intrinsically higher capacity than LIBs, they are the preferred technology for primary batteries. Moreover, since LMBs can be manufactured in the fully charged state, they do not require the lengthy formation process needed for LIBs, which can take between 20-30 days. However, poor cycle life, volumetric expansion, and the tendency to form lithium metal dendrites, which can lead to violent combustion of LMBs, have limited their practical use as rechargeable batteries.

Lithium anodes in rechargeable lithium metal batteries (LMBs) are considered the "Holy Grail" of anode materials due to their remarkably high theoretical specific capacity of 3860 mAh/g and low reaction voltage. Lithium metal is the lightest metal on the periodic table, and it is especially desired for applications that require a low ratio of volume to weight, such as electric vehicles. The most promising LMB's are Lithium Sulfur (Li—S), Lithium Air (Li—$O_2$), and Solid-State or Semi-Solid LMB's. While primary batteries manufactured with lithium metal foils are widely commercialized, numerous barriers to the commercialization of rechargeable LMB's include low Coulombic efficiency, poor cycle life, soft shorts, volumetric expansion and the growth of Li dendrites during plating—which can lead to thermal runaway and other catastrophic failures. Tremendous efforts have been made to suppress dendrite formation including by providing additives in electrolytes, varying the salt concentration, creating artificial passivating layers on lithium metal (allowing one to handle lithium metal in dry air for a brief amount of time, but at the cost of higher impedance), and manipulating electrode-electrolyte interfacial structure—which is extremely difficult to do when a foil is mechanically fused to a substrate to create a negative electrode, and that negative electrode is then mechanically fused to a solid-state electrolyte.

Other barriers include the quality and cost of available lithium metal raw material, handling of lithium metal, and the mechanical challenges of manufacturing a lithium anode. These barriers increase by orders of magnitude when attempting to mechanically manufacture a solid-state LMB. Since 1976, researchers—including Nobel Prize winners—have attempted to solve all these problems to no avail. It is 2020 and the absence of a commercially viable battery for consumer applications—despite the efforts of the best minds in the field—is stinging.

The current commercially available supply of lithium metal is produced by molten salt electrolysis of lithium chloride. Lithium is poured into a mold and extruded into foils that range in thickness from 100 μm-750 μm. For environmental reasons, lithium metal foils are generally produced in China. Because of lithium's classification as a flammable and potentially explosive material, these foils must then be shipped under mineral oil to a battery manufacturer. The process yields an impure foil that, under scanning electron microscope (SEM) imaging, appears intrinsically dendritic, with an uneven surface that can vary by +/−50 μm (U.S. Pat. No. 10,177,366, FIG. 11A). The resulting impure product, while sufficient for primary lithium batteries, is not usable in rechargeable LMB's.

Shipping and handling, and the required immersion in mineral oil compromise the integrity of the lithium metal. Prior to use in batteries, the mineral oil must be removed, which further compromises the lithium. Some battery developers manually scrape lithium from under the top layer to use and spread it on the copper or other substrate like peanut butter. Some take the lithium metal foil, and vapor deposit it onto a substrate, which is both expensive and energy intensive.

Impurities in the present supply of lithium metal foil provide an additional barrier to the commercialization of LMB's. As an alkali metal, lithium has one loosely held valence electron, causing it to be inherently reactive. Notably, lithium is the only alkali metal that reacts with nitrogen in the air, forming the nitride $Li_3N$. Due to undesirable side-reactions, the introduction of impurities into the lithium foil severely limits the operation of a working battery. In particular, a recent study found that such impurities can lead to the nucleation of sub-surface dendritic structures. (Harry et al., Nat. Mater. 13, 69-73 (2014)). The manufacturer of the lithium foil in the study (FMC Lithium) listed a number of elements other than lithium, the most abundant at a concentration of 300 ppm by weight is nitrogen, likely in the form of $Li_3N$. (U.S. Pat. No. 4,781,756). Other common impurities include: Na, Ca, K, Fe, Si, Cl, B, Ti, Mg and C. While this is not an exhaustive list, the elements mentioned are the most common. Nitrogen in any form is particularly undesirable in rechargeable LMBs. Nitrogen forms voids and pits in the lithium metal as a battery cycles and also consumes lithium with these reactions. The presence of impurities such as nitrogen leads to slowed and uneven lithium deposition on a negative electrode during charging, affecting the overall current distribution in the battery and creating hot spots.

The unevenness of the lithium foil surface caused by nitrogen and other impurities is also highly problematic because it prevents uniform contact of the substrate with the electrode, leading to soft shorts and again, uneven distribution of current, which in turn can lead to dendrites and other undesirable effects.

A method is needed to provide a pure lithium metal anode, which overcomes the purity issues heretofore limiting the capacity and recycling life of LMBs.

SUMMARY OF THE EMBODIMENTS

While the general approach is to suppress all the problems inherent in the existing supply of raw material, an approach which has not been successful in over forty-three years, the inventor proposes to address the materials problem and the manufacturing problem simultaneously by producing a highly improved lithium metal product (a full negative electrode) and vertically integrating lithium metal production into battery manufacturing facilities.

In accordance with an embodiment of the invention, a method of manufacturing a lithium electrode is described, the method including the steps of:

(1) providing an electrolytic cell, the electrolytic cell including:
   a first chamber containing a positive electrode, and an aqueous lithium salt solution in contact with the positive electrode;
   a second chamber containing a conductive substrate configured as a negative electrode, the conductive substrate being stationary in the chamber during lithium metal electrodeposition, a lithium ion-selective membrane separating the first chamber from the second chamber, and a non-aqueous electrolyte disposed between the conductive substrate and the lithium ion selective membrane, physically contacting both the conductive substrate and the lithium ion selective membrane;
   the electrolytic cell being configured to allow passage of lithium ions through the lithium ion selective membrane between the first and the second chambers, and to preclude the passage of other chemical species between the first and the second chambers;

(2) blanketing the electrolytic cell with a blanketing atmosphere, the blanketing atmosphere being substantially free of lithium reactive components;

(3) applying a variable voltage in order to maintain a constant current across the negative electrode and the positive electrode, thereby causing lithium ions to cross from the first chamber to the second chamber, through the lithium ion selective membrane and the non-aqueous electrolyte, and electrodeposit a first layer of lithium onto the conductive substrate, thereby forming the lithium electrode, the first layer of lithium having an inner face and an outer face, the inner face of the first layer of lithium bonded to the conductive substrate;

wherein the constant current is between about 10 mA/cm$^2$ and about 50 mA/cm$^2$, and wherein the constant current is applied for a time between about 1 minute and about 60 minutes.

According to some embodiments, the blanketing atmosphere includes no more than 10 ppm of lithium reactive components on a molar basis. In some embodiments the blanketing atmosphere includes no more than 10 ppm nitrogen on a molar basis. In some embodiments, the blanketing atmosphere includes no more than 5 ppm nitrogen on a molar basis.

According to some embodiments, the conductive substrate comprises a plate having a first face and a second face, wherein the inner face of the first layer of lithium metal bonds to the first face of the conductive substrate.

According to some embodiments, the aqueous lithium salt solution comprises a lithium salt selected from the group consisting of $L_2SO_4$, $Li_2CO_3$, and combinations thereof. In a preferred embodiment, the aqueous lithium salt solution includes $Li_2SO_4$.

According to some embodiments, the conductive substrate is selected from a group consisting of copper, aluminum, graphite coated copper, and nickel.

According to some embodiments, the lithium ion selective membrane includes a polymeric matrix and a plurality of ion-conducting particles disposed within the polymeric matrix. In some embodiments, the lithium ion selective membrane comprises a glass frit with lithium ion conducting particles disposed within. According to some embodiments, the blanketing atmosphere comprises argon with a purity of greater than 99.998 weight percent. According to some embodiments, the lithium electrode has a specific capacity of greater than about 3800 mAh per gram of lithium.

In accordance with an embodiment of the invention, a method of manufacturing a lithium electrode is described, the method including the steps of:

(1) providing a gas-impermeable container, the container enclosing:
   a blanketing atmosphere, the blanketing atmosphere being substantially free of lithium reactive components;
   an electrolytic cell, the electrolytic cell being blanketed completely by the blanketing atmosphere, and including:
      a conductive substrate, stationary within the cell, configured as a negative electrode;
      a positive electrode;
      an aqueous lithium salt solution interposed between the conductive substrate and the positive electrode;
      a lithium ion-selective membrane configured to function as a solid state electrolyte, covering the conductive substrate, and forming a barrier separating the aqueous lithium salt solution and the conductive substrate;
   the electrolytic cell being configured to allow passage of lithium ions from the lithium salt solution through the lithium ion selective membrane and onto the surface of the conductive substrate, and to preclude the passage of other chemical species;

(2) applying a variable voltage in order to maintain a constant current across the negative electrode and the positive electrode, thereby causing lithium ions to cross from the lithium salt solution through the lithium ion selective membrane, and electroplate a layer of lithium onto the conductive substrate, thereby forming the lithium electrode, the layer of lithium having an inner face and an outer face, the inner face bonding to the conductive substrate and the outer face bonding to the lithium ion-selective membrane;

wherein the constant current is between about 10 mA/cm$^2$ and about 50 mA/cm$^2$, and wherein the constant current is applied for a time between about 1 minute and about 60 minutes.

In accordance with an embodiment of the invention, a method of manufacturing a lithium metal battery is described, comprising:

(1) manufacturing a lithium electrode according to methods of the instant invention;

(2) assembling a casing with contents including the lithium electrode configured as an anode, and other components necessary to form the lithium metal battery;

(3) sealing the casing to isolate the contents of the casing from reactants present in the air, thereby providing the lithium metal battery.

In preferred embodiments, LIMBs are fabricated in a single manufacturing facility. In some embodiments, all steps of battery manufacture are performed under a blanketing atmosphere substantially free of lithium reactive components.

In some embodiments the lithium metal battery is fabricated with a lithium metal electrode having a layer of lithium metal bonded to the conductive substrate, wherein the layer of lithium metal includes no more tha 5 ppm of non-metallic elements by mass.

In accordance with an embodiment of the invention, a method of manufacturing a lithium metal battery is described, comprising:

(1) providing an electrolytic cell, the electrolytic cell including:
- a conductive substrate, stationary within the electrolytic cell, the conductive substrate comprising a plate having a first face and a second face;
- a first chamber containing a first positive electrode, and a first aqueous lithium salt solution in contact with the first positive electrode;
- a second chamber containing a first lithium ion-selective membrane separating the first chamber from the second chamber, and a first non-aqueous electrolyte disposed between the first face of the conductive substrate and the first lithium ion selective membrane, physically contacting both the first face of the conductive substrate and the lithium ion selective membrane;
- a third chamber containing a second lithium ion-selective membrane and a non-aqueous electrolyte disposed between the second face of the conductive substrate and the second lithium ion selective membrane, physically contacting both the second face of the conductive substrate and the second lithium ion selective membrane;
- a fourth chamber containing a second positive electrode, and a second aqueous lithium salt solution in contact with the second positive electrode;
- the second lithium ion-selective membrane separating the third chamber from the fourth chamber;
- the electrolytic cell being configured to allow passage of lithium ions through the first lithium ion selective membrane between the first and the second chambers, and to preclude the passage of other chemical species between the first and the second chambers;
- the electrolytic cell being configured to allow passage of lithium ions through the second lithium ion selective membrane between the fourth and the third chambers, and to preclude the passage of other chemical species between the fourth and the third chambers;

(2) blanketing completely the electrolytic cell with a blanketing atmosphere, the blanketing atmosphere being inert to chemical reaction with lithium;

(3) applying a variable voltage in order to maintain a constant current across the conductive substrate and the first positive electrode, and across the conductive substrate and the second positive electrode, thereby causing lithium ions to cross from the first chamber to the second chamber, through the first lithium ion selective membrane and the first non-aqueous electrolyte, and electroplate a first layer of lithium onto the first face of the conductive substrate, and further causing lithium ions to cross from the fourth chamber to the third chamber, through the second lithium ion selective membrane and the second non-aqueous electrolyte, and electroplate a second layer of lithium onto the second face of the conductive substrate, thereby forming the lithium electrode, the lithium electrode comprising the conductive substrate, the first layer of lithium, and the second layer of lithium, the first layer of lithium having an inner face and an outer face, the inner face bonded to the first face of the conductive substrate, the second layer of having an inner face and an outer face, the inner face bonded to the second face of the conductive substrate;

wherein the constant current is between about 10 mA/cm$^2$ and about 50 mA/cm$^2$, and wherein the constant current is applied for a time between about 1 minute and about 60 minutes.

In accordance with an embodiment of the invention, a method of manufacturing a lithium metal battery is described, comprising:

(1) providing an electrolytic cell, the electrolytic cell including:
- a conductive substrate, stationary within the cell, the conductive substrate comprising a plate having a first face and a second face, the first face covered with a first lithium ion-selective membrane, and the second face covered with a second lithium ion-selective membrane, the first and second lithium ion-selective membranes configured to function as solid state electrolytes;
- a first chamber containing a first positive electrode, and a first aqueous lithium salt solution in contact with the first positive electrode and with the first lithium ion-selective membrane;
- a second chamber containing a second positive electrode, and a second aqueous lithium salt solution in contact with the first positive electrode and with the second lithium ion-selective membrane;
- the electrolytic cell being configured to allow passage of lithium ions through the first lithium ion selective membrane between the first chamber and the first face of the conductive substrate, and to preclude the passage of other chemical species between the first chamber and the first face of the conductive substrate;
- the electrolytic cell being configured to allow passage of lithium ions through the second lithium ion selective membrane between the second chamber and the second face of the conductive substrate, and to preclude the passage of other chemical species between the second chamber and the second face of the conductive substrate;

(2) blanketing completely the electrolytic cell with a blanketing atmosphere, the blanketing atmosphere being inert to chemical reaction with lithium;

(3) applying a variable voltage in order to maintain a constant current across the conductive substrate and the first positive electrode, and across the conductive substrate and the second positive electrode, thereby causing lithium ions to cross from the first chamber through the first lithium ion selective membrane, and electroplate a first layer of lithium onto the first face of the conductive substrate, and further causing lithium ions to cross from the second chamber through the second lithium ion selective membrane, and electroplate a second layer of lithium onto the second face of the conductive substrate, thereby forming the lithium electrode, the lithium electrode comprising the conductive substrate, the first layer of lithium, and the second layer of lithium, the first layer of lithium having an inner face and an outer face, the inner face of the first layer of lithium bonded to the first face of the conductive substrate, and the outer face of the first layer of lithium bonded to the first lithium ion-selective membrane, the second layer of lithium having an inner face and an outer face, the inner face of the second layer of lithium bonded to the second face of the conductive substrate, and the outer face of the second layer of lithium bonded to the second lithium ion-selective membrane;

wherein the constant current is between about 10 mA/cm² and about 50 mA/cm², and wherein the constant current is applied for a time between about 1 minute and about 60 minutes.

In accordance with an embodiment of the invention, a method of manufacturing a lithium metal electrode is described, wherein a lithium ion selective membrane is immoveable in an electrolytic cell, and wherein as a first layer of lithium is formed, the first layer of lithium displaces non-aqueous electrolyte from a space between the conductive substrate and the lithium ion-selective membrane, thereby bonding the inner face of the first layer of lithium to the conductive substrate and the outer face of the first layer of lithium to the ion selective membrane, thereby forming a lithium metal electrode comprising the conductive substrate and the first layer of lithium metal, with the inner face of the first layer of lithium bonded to the conductive substrate, and the outer face of the first layer of lithium bonded to the lithium ion-selective membrane, which is configured to function as a solid state electrolyte when the lithium metal electrode is incorporated into a galvanic cell.

In accordance with an embodiment of the invention, a method of manufacturing a lithium metal battery is described, wherein first and second lithium ion selective membranes are immovable in an electrolytic cell, and wherein as a first layer of lithium is formed, the first layer of lithium displaces a first non-aqueous electrolyte from a space between a first face of the conductive substrate and the first lithium ion-selective membrane, thereby bonding the inner face of the first layer of lithium to the first face of the conductive substrate and the outer face of the first layer of lithium to the first lithium ion selective membrane, and wherein as a second layer of lithium is formed, the second layer of lithium displaces a second non-aqueous electrolyte from a space between the second face of the conductive substrate and the second lithium ion-selective membrane, thereby bonding the inner face of the second layer of lithium to the second face of the conductive substrate and the outer face of the second layer of lithium to the second lithium ion-selective membrane, thereby forming a lithium metal electrode comprising the conductive substrate and the first and second layers of lithium metal, with the inner face of the first layer of lithium bonded to the first face of the conductive substrate, and the outer face of the first layer of lithium bonded to the first lithium ion-selective membrane, and further with the inner face of the second layer of lithium bonded to the second face of the conductive substrate, and the outer face of the second layer of lithium bonded to the second lithium ion-selective membrane, wherein the first and second lithium ion-selective membranes are configured to function as solid state electrolytes when the lithium metal electrode is incorporated into a galvanic cell.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "cathode" is an electrode where reduction occurs.

An "anode" is an electrode where oxidation occurs.

A "working anode" is the anode in a galvanic cell.

A "positive electrode" is the anode in an electrolytic cell, and the cathode in a galvanic cell.

A "negative electrode" is the cathode in an electrolytic cell and the anode in a galvanic cell. Consequently, a lithium metal electrode is always a "negative electrode" even though it is a cathode in an electrolytic cell and an anode in a galvanic cell.

In the context of this application, a "lithium metal electrode" and a "lithium electrode" are synonymous, and each refers to a negative electrode comprising lithium metal.

A "lithium metal battery" (or "LMB") is a battery that utilizes a negative electrode comprising pure lithium metal (i.e. a lithium metal electrode). The positive electrode for such a battery is typically an intercalation compound such as $Ti_2S$, which, during discharge, accepts electrons through an external circuit from the anode, and intercalates $Li^+$ into its lattice structure.

A "lithium ion battery" is a rechargeable battery where lithium ions shuttle between a negative electrode and an intercalation compound as the positive electrode.

A blanketing atmosphere is "substantially free" of lithium reactive components when the atmosphere includes no more than 10 ppm of lithium reactive components.

In the context of this disclosure, a "vertically integrated" lithium metal manufacturing facility is a facility where lithium metal anodes are fabricated by electrodepositing at the facility, and integrated into the battery manufacturing process.

Figure 1:
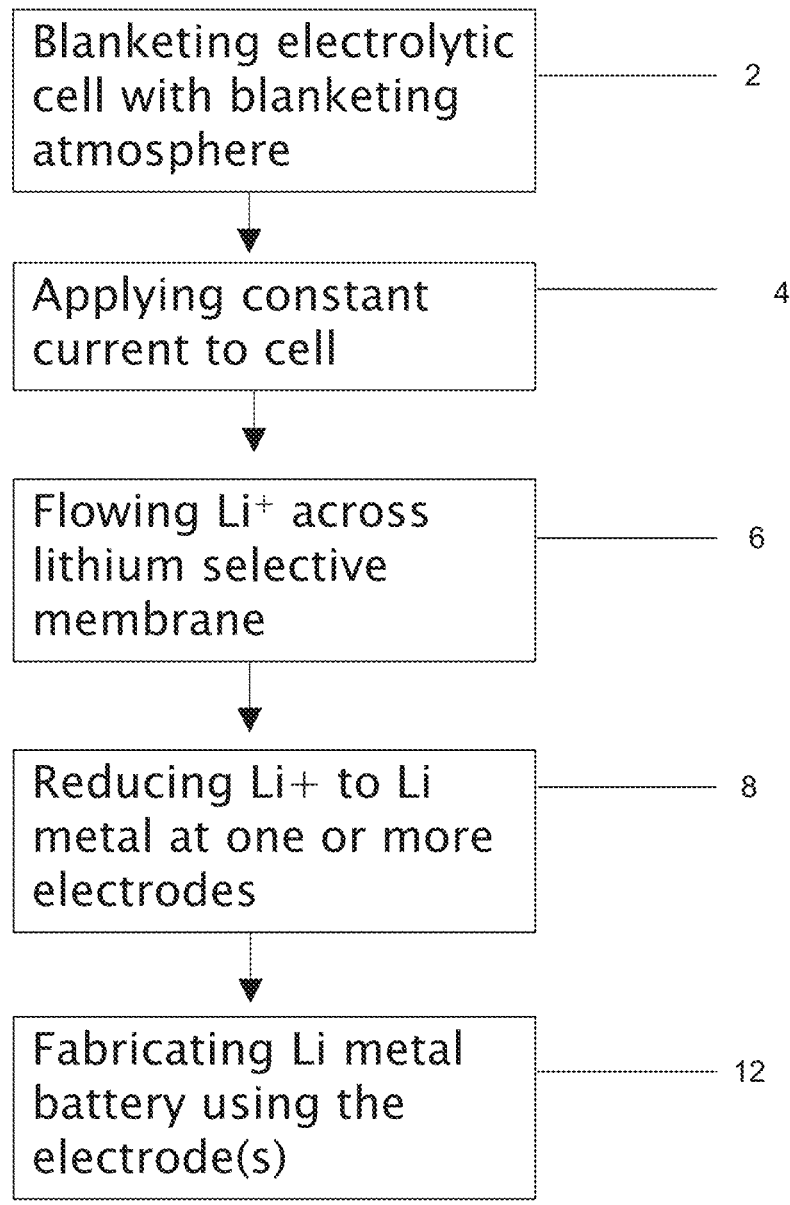
FIG. 1 shows steps in manufacturing a lithium metal battery according to an embodiment of the invention.

FIG. 1 shows steps in manufacturing a lithium metal battery (LMB) according to embodiments of the current invention. An electrolytic cell, such as in the embodiments of FIGS. 2, 4, 6, 7, 9, and 10 is blanketed with blanketing atmosphere 2, the blanketing atmosphere being substantially free of lithium reactive components, including nitrogen, oxygen, ozone, oxides of nitrogen, sulfur and phosphorous, carbon dioxide, halogens, hydrogen halides, and water. In some embodiments, the blanketing atmosphere includes no more than 10 ppm of lithium reactive components on a molar basis. In some embodiments, the blanketing atmosphere includes no more than 5 ppm of lithium reactive components on a molar basis. In preferred embodiments, the blanketing atmosphere contains no more than 10 ppm nitrogen on a molar basis. In preferred embodiments, the blanketing atmosphere contains no more than 5 ppm nitrogen on a molar basis. In preferred embodiments, the blanketing atmosphere contains no more than 1 ppm nitrogen on a molar basis. In preferred embodiments, the blanketing atmosphere is argon gas. In preferred embodiments, the argon gas has a purity of greater than 99.998 weight percent. The electrolytic cell operates at or near room temperature, and uses an aqueous lithium salt solution as an anolyte providing a lithium feed for electrodepositing to form a negative electrode. In preferred embodiments, the aqueous lithium salt solution includes lithium sulfate ($Li_2SO_4$) and/or lithium carbonate ($Li_2CO_3$). When a $Li_2SO_4$ solution is used as feed, the only byproduct is $O_2$ gas which is generated at the anode, vented from the anolyte, and does not come into contact with the inert catholyte area. $Li_2SO_4$ is a lithium feedstock that is very low in the process chain, and thus $Li_2SO_4$ solutions provide an economical source of lithium ions for methods according to the instant invention. When $Li_2CO_3$ is used as feedstock, the minimal amount of carbon dioxide generated can likewise be vented off at the anode of the electrolysis cell. Typically, $Li_2CO_3$ is more expensive than $Li_2SO_4$. However, it is not uncommon for battery manufacturers to receive lithium carbonate that fails to meet quality control standards, and such lithium carbonate could be easily repurposed for lithium metal production. The aqueous lithium salt solutions do not need to be highly concentrated since as lithium ions are depleted by electrodeposition, flow cells may allow depleted lithium ions to be replaced.

Voltage across the electrolytic cell is regulated in order to apply a constant current to the cell 4. The applied voltage causes lithium ions to flow across a lithium ion-selective membrane from the anolyte to a catholyte 6, wherein the lithium ion-selective membrane is configured to allow the passage of lithium ion but to preclude the passage of other chemical species. At the cathode, lithium ion is reduced to the lithium metal, thereby plating onto a conductive substrate, and forming a lithium metal electrode 8. In some embodiments the conductive substrate is selected from the group consisting of copper, aluminum, graphite coated copper, and nickel. In a preferred embodiment, the conductive substrate is copper. When constant current is applied within the range of about 10 $mA/cm^2$ to about 50 $mA/cm^2$, the lithium ions crossing the lithium ion selective membrane and electrodepositing onto a conductive substrate do not produce nanorods or dendrites. Rather, current within this range produces an extremely dense lithium metal deposit and allows electrodeposition to proceed to completion in between one and 60 minutes. In preferred embodiments, the constant current applied is about 10 $mA/cm^2$ to about 50 $mA/cm^2$. In preferred embodiments, the constant current applied is about 25 $mA/cm^2$ to about 50 $mA/cm^2$. In preferred embodiments, the constant current applied is about 40 $mA/cm^2$ to about 50 $mA/cm^2$. In preferred embodiments, the density of the lithium metal deposited ranges from about 0.4 $g/cm^3$ to 0.543 $g/cm^3$. In some preferred embodiments the density of lithium metal deposited ranges from 0.45 $g/cm^3$ to 0.543 $g/cm^3$. A constant current of about 10 $mA/cm^2$ to about 50 $mA/cm^2$ is higher than the operating current during charge/discharge cycles of operating batteries manufactured using lithium metal electrodes of the invention. Lithium metal electrodes formed at higher current densities than are used in an operating battery enhance the charge-discharge recycling capacity of such batteries. Without being bound by theory, it is believed that lithium metal electrodes formed at higher current densities than are used in an operating battery will not form dendrites upon cycling if there are no impurities elsewhere in the battery. During the electrodeposition process, lithium continually passes through a lithium ion selective membrane and accumulates on the conductive substrate until the desired thickness is achieved (a film of 15 μm can be made in under five minutes). Only lithium ions pass through from the lithium ion containing aqueous electrolyte, allowing for the use of inexpensive impure feed solutions containing $Li_2SO_4$. and/or $Li_2CO_3$. The lithium electrodeposited on the negative electrode is elementally pure and remains so because it is never handled or exposed to air prior to entering a battery. Because the electrodepositing occurs in a blanketing atmosphere substantially free of lithium-reactive components, including nitrogen, the formation of impurities, including in particular $Li_3N$, is avoided.

In some embodiments, the lithium electrodeposited on the negative electrode coats all sides of the negative electrode. In some embodiments, the copper is in the form of a mesh. In some embodiments, the copper is in the form of a foam. In some embodiments, the conductive substrate comprises a plate with two faces, and lithium metal coats at least one face of the plate. In some embodiments, the lithium metal coats both of the two faces of the plate.

In some embodiments, the lithium ion selective membrane is a hybrid organic-inorganic membrane including a polymeric matrix and a plurality of ion-conducting particles disposed within the polymeric matrix. In some such embodiments, an inorganic coating is deposited on the polymeric matrix, the inorganic coating being a uniform layer of 1 to 10,000 atoms thick. In some embodiments, the polymer may be a silica-based polyurethane, polyethylene oxide, polystyrene, or a polyamide.

In some embodiments, the lithium ion selective membrane comprises a glass frit with lithium ion conducting particles disposed within.

In some embodiments, the ion conducting particles are selected from the group consisting of $LiFePO_4$, $LiCoO_2$, NASICON electrolytes, lithium-lanthanum titanates (LLTO), garnet type electrolytes, LISICON and Thio-LISICON electrolytes, $Li_7La3Zr3O_{12}$ (LLZO), the cubic phase (c-LLZO).

Finally, the lithium metal electrode thus formed is used in the fabrication of a LMB 12. In a preferred embodiment, all of the steps in the manufacturing method are performed at a single manufacturing facility. In some embodiments, the single manufacturing facility is contained in an area of no greater than 10 $km^2$. In some embodiments the manufacturing facility is contained in an area less than about 1 $km^2$. Because lithium metal batteries of the instant invention are fabricated in a fully charged state, the invention reduces the footprint, cost and time of rechargeable batteries compared to conventional LIBs, which are initially fabricated in an uncharged state, and require time-consuming finishing steps to obtain a fully charged battery.

Figure 2:
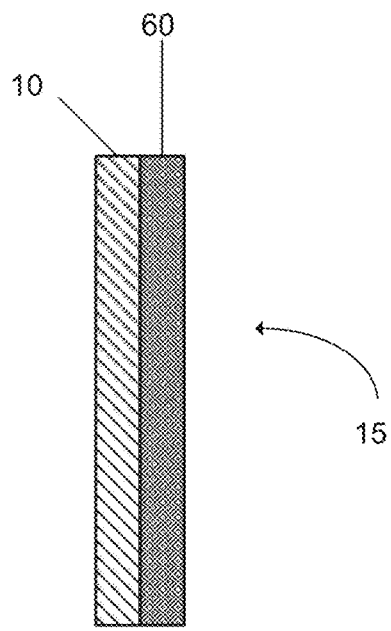
FIG. 2 shows an improved, single-sided lithium metal electrode, suitable for use as a working anode of a lithium metal battery, according to an embodiment of the invention.

FIG. 2 provides a single-sided lithium electrode 15 according to an embodiment of the invention. The lithium electrode 15 includes a conductive substrate 10, in the form of a plate having two faces. In preferred embodiments, the conductive substrate is selected from the group consisting of copper, aluminum, graphite coated copper, and nickel. Bonded to one of the two faces of the conductive substrate is a layer of lithium metal 60, the lithium metal including no more than 5 ppm of non-metallic elements by mass. In a preferred embodiment, the lithium metal includes no more than 1 ppm of non-metallic elements by mass. In a preferred embodiment, the lithium metal includes no more than 1 ppm of nitrogen by mass. In a preferred embodiment, the layer of lithium metal 60 has a thickness between about 1 micron and about 10 microns. The conductive substrate 10 and the layer of lithium metal 60 together comprise the single-sided lithium metal electrode 15, suitable for use as a fully charged working anode in a LMB. In a preferred embodiment, the lithium metal electrode 15 has a specific capacity of greater than about 3800 mAh per gram of lithium metal. In a preferred embodiment, the layer of lithium metal 60 has a density of between about 0.4 $g/cm^3$ and about 0.534 $g/cm^3$. In a preferred embodiment, the layer of lithium metal 60 has a density of between about 0.45 $g/cm^3$ and about 0.543 $g/cm^3$.

Figure 3:
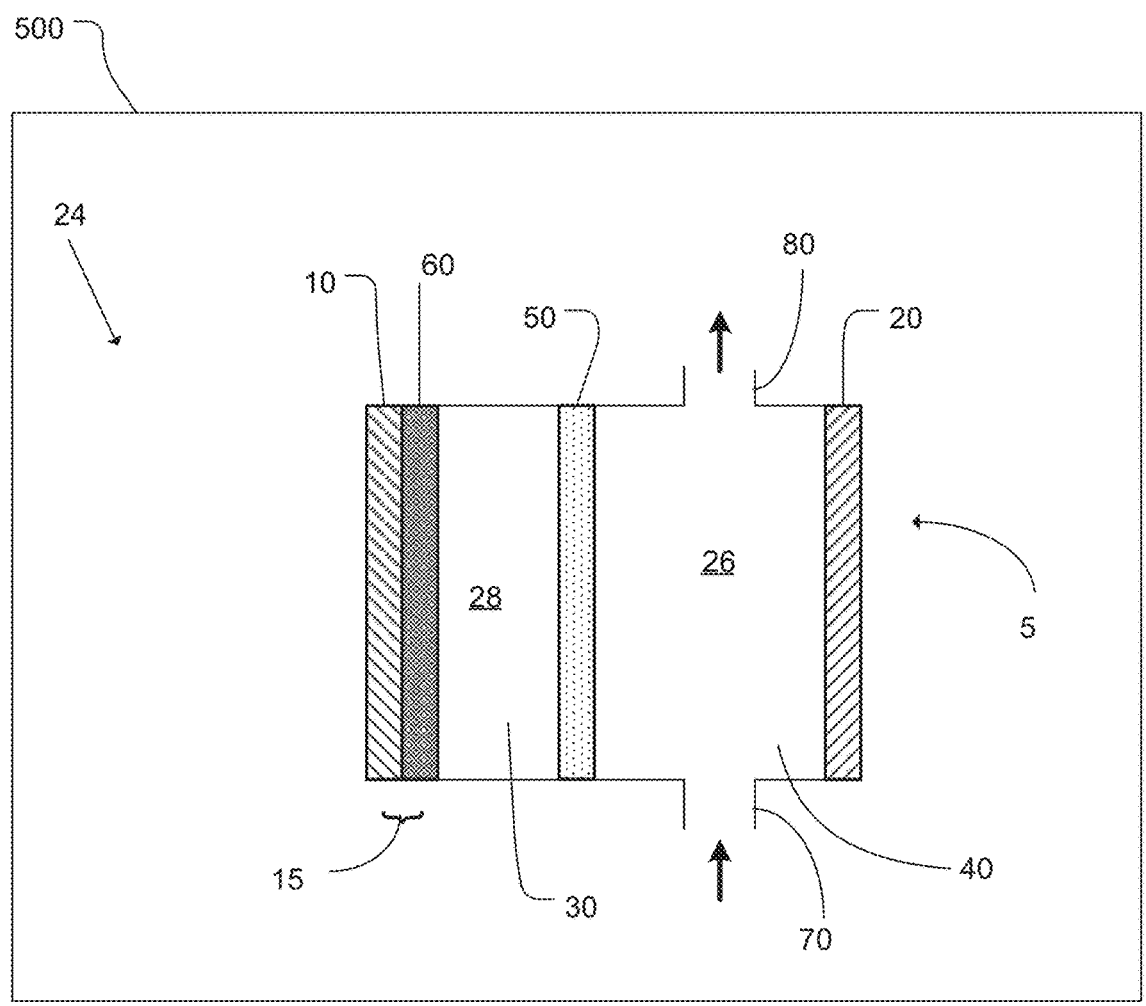
FIG. 3 shows an electrolytic cell for manufacturing an improved, single-sided lithium metal electrode suitable for use as a working anode in a lithium metal battery, according to an embodiment of the invention.

In a method of manufacturing the single-sided lithium electrode 15 shown in FIG. 2, an electrolytic cell 5 is used, as shown in FIG. 3. During the manufacturing process, the electrolytic cell 5 of this embodiment is completely blanketed with a blanketing atmosphere 24, the blanketing atmosphere being substantially free of lithium reactive components. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIG. 3, the blanketing atmosphere 24 and the electrolytic cell 5 are enclosed in a gas-impermeable container 500. The cell 5 includes a first chamber 26 and a second chamber 28. The first chamber 26 contains a positive electrode 20 and an aqueous lithium salt solution 40 in contact with the positive electrode 20. The second chamber 28 contains the lithium metal electrode 15, a lithium ion-selective membrane 50, and a non-aqueous electrolyte 30. The lithium ion selective membrane 50 has a first side and a second side, and physically separates the first chamber 26 from the second chamber 28, contacting the aqueous lithium salt solution 40 on the first side. In the second chamber 28, the non-aqueous electrolyte 30 is disposed between the lithium metal electrode 15 and the second side of the lithium ion-selective membrane 50, physically contacting both the lithium metal electrode 15 and the second side of the lithium ion-selective membrane 50. The lithium metal electrode 15 includes a conductive substrate 10, stationary during lithium metal electrodeposition within the second chamber, electrodeposited with a layer of elemental lithium 60. The lithium ion selective membrane 50 allows lithium ions to pass between the first chamber 26 and the second chamber 28, but precludes the passage of other chemical species between the two chambers. In particular, the lithium ion selective membrane does not allow water to pass from the first chamber 26 to the second chamber 28.

In manufacturing the single-sided lithium metal electrode 15 embodied in FIG. 2, a variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion selective membrane 50, into the non-aqueous electrolyte, travel to the surface of the stationary conductive substrate 10, where each lithium ion gains an electron, thereby causing the layer of elemental lithium 60 to be electrodeposited on the conductive substrate 10, thereby forming the single-sided lithium metal electrode 15.

In some embodiments, the first chamber 26 of the electrolytic cell 5 of FIG. 2 is a flow chamber, with an entrance port 70 and an exit port 80 allowing aqueous lithium salt solution to enter the first chamber 26 to provide a renewable supply of lithium ions for electrodepositing.

In preferred embodiments, the constant current is between about 10 $mA/cm^2$ and about 50 $mA/cm^2$. In preferred embodiments, the constant current applied is about 25 $mA/cm^2$ to about 50 $mA/cm^2$. In preferred embodiments, the constant current applied is about 40 $mA/cm^2$ to about 50 $mA/cm^2$. In preferred embodiments, the constant current is applied for a time between about 1 minute and about 60 minutes.

In preferred embodiments, the aqueous lithium salt solution 40 is selected from the group consisting of $Li_2SO_4$, $Li_2CO_3$, and combinations thereof. In preferred embodiments, the aqueous lithium salt solution 40 includes $Li_2SO_4$. In preferred embodiments, the lithium ion selective membrane 50 comprises a polymeric matrix and a plurality of ion-conducting particles disposed within the polymeric matrix. In a preferred embodiment, the lithium ion selective membrane 50 includes a glass frit with lithium ion conducting particles disposed within.

Figure 4:
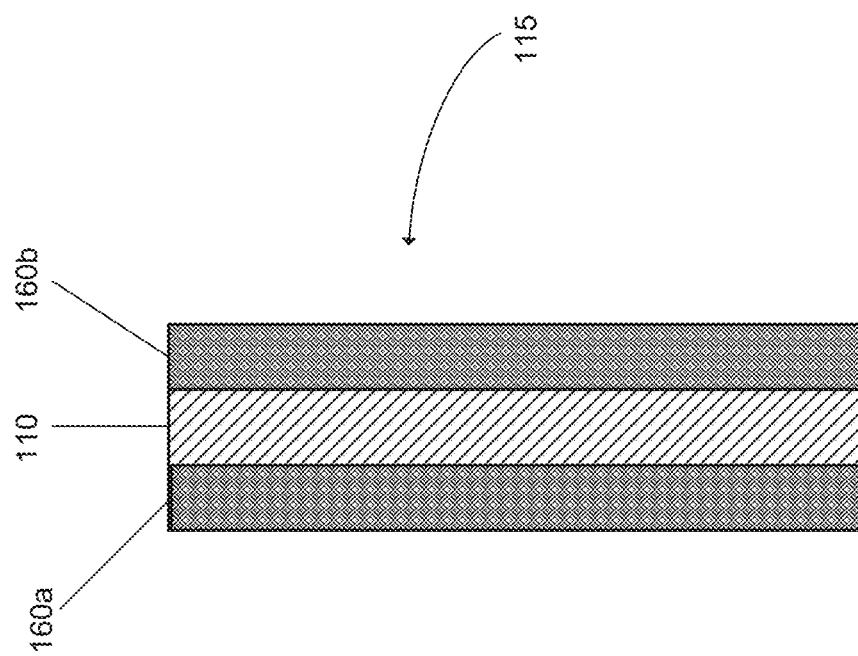
FIG. 4 shows an improved, double-sided lithium electrode, suitable for use as a working anode in a lithium metal battery, according to an embodiment of the invention.

FIG. 4 provides a double-sided lithium metal electrode, according to an embodiment of the invention. The double-sided lithium metal electrode 115 includes a conductive substrate 110, in the form of a plate having a first face and a second face. In preferred embodiments, the conductive substrate 115 is selected from the group consisting of copper, aluminum, graphite coated copper, and nickel. The first face and a second face of the conductive substrate 115 are coated with a layer of lithium metal, 160a and 160b, respectively, the lithium metal including no more than 5 ppm of non-metallic elements by mass. In a preferred embodiment, the lithium metal includes no more than 1 ppm of non-metallic elements by mass. In a preferred embodiment, the layer of lithium metal 160a, 160b has a thickness between about 1 micron and about 10 microns. The conductive substrate 110 and the layers of lithium metal 160a and 160b together comprise the double-sided lithium metal electrode 115, which is suitable for use as a fully charged working anode in a LMB. In a preferred embodiment, the lithium metal electrode 115 has a specific capacity of greater than about 3800 mAh per gram of lithium metal. In a preferred embodiment, the layers of lithium metal 160a, 160b each have a density of between about 0.4 g/cm$^3$ and about 0.543 g/cm$^3$. In a preferred embodiment, the layers of lithium metal 160a, 160b each have a density of between about 0.45 g/cm$^3$ and about 0.543 g/cm$^3$.

Figure 5:
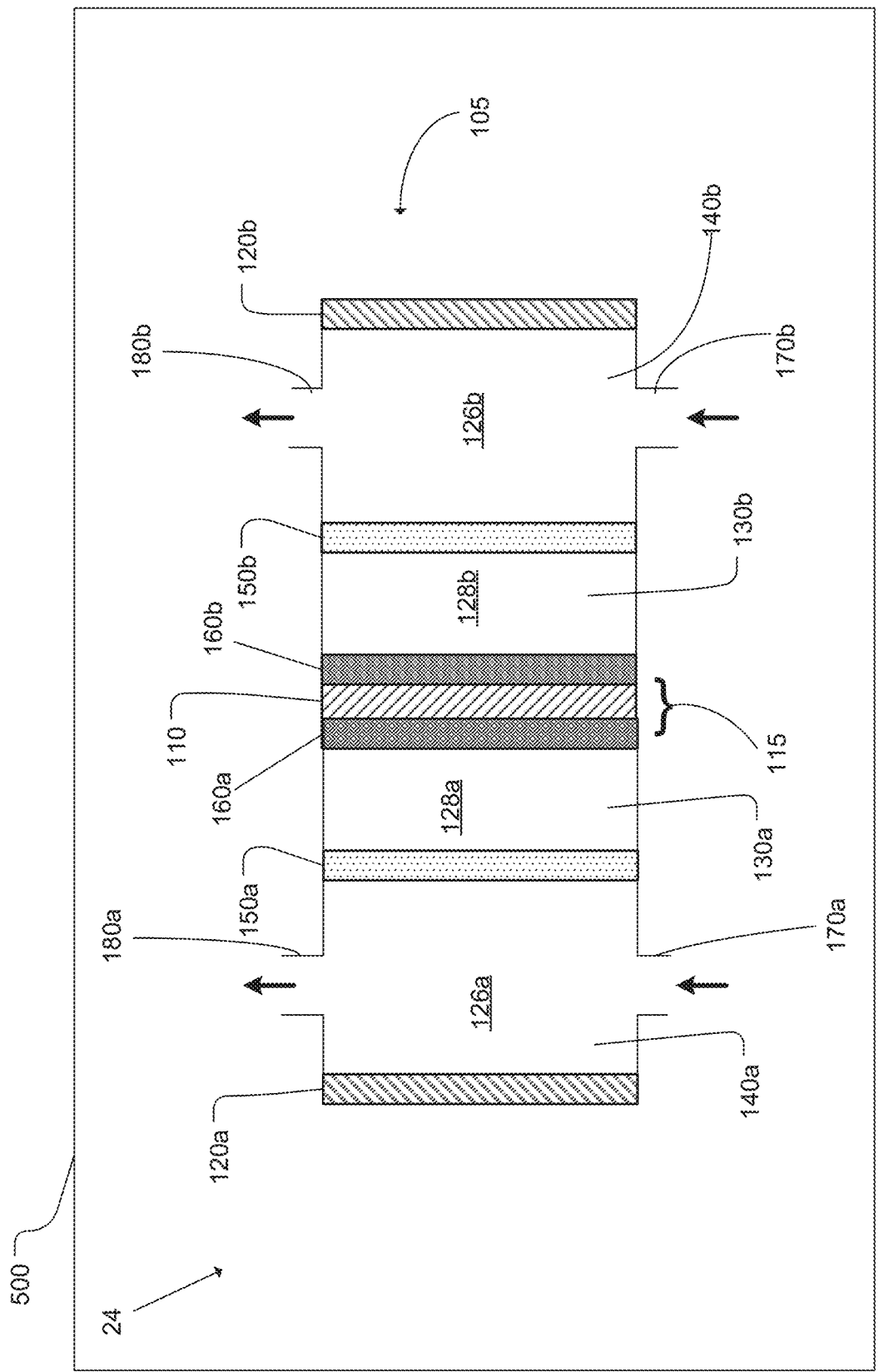
FIG. 5 shows an electrolytic cell suitable for manufacturing a double-sided electrode suitable for use as a working anode in a lithium metal battery, according to an embodiment of the invention.

In a method of manufacturing the double-sided lithium electrode 115 shown in FIG. 4, an electrolytic cell 105 is used, as shown in FIG. 5. During the manufacturing process, the electrolytic cell 105 of this embodiment is blanketed with a blanketing atmosphere 24, the blanketing atmosphere 24 being inert to chemical reaction with lithium. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIG. 5, the blanketing atmosphere 24 and the electrolytic cell 105 are enclosed in a gas-impermeable container 500. The cell 105 includes a first chamber 126a, a second chamber 128a, a third chamber 126b, and a fourth chamber 128b. The first chamber 126a contains a positive electrode 120a and an aqueous lithium salt solution 140a in contact with the positive electrode 120a and the third chamber 126b contains a positive electrode 120b and an aqueous lithium salt solution 140b in contact with the positive electrode 120b. The second chamber 128a and the fourth chamber 128b share the double-sided lithium metal electrode 115, which bounds the two chambers, the double-sided lithium metal electrode 115 including a central conductive substrate 110 having a first face and a second face, the first and the second faces electrodeposited with the layers of lithium metal 160a, 160b, respectively, with the layer of lithium metal 160a extending into the second chamber 128a, and the layer of lithium metal 160b extending into the fourth chamber. The second chamber 128a contains a lithium ion-selective membrane 150a, and a non-aqueous electrolyte 130a. The lithium ion selective membrane 150a has a first side and a second side, and physically separates the first chamber 126a from the second chamber 128a, contacting the aqueous lithium salt solution 140a on the first side. In the second chamber 128a, the non-aqueous electrolyte 130a is disposed between the lithium metal layer 160a and the second side of the lithium ion-selective membrane 150a. The fourth chamber contains a lithium ion-selective membrane 150b, and a non-aqueous electrolyte 130b. The lithium ion selective membrane 150b has a first side and a second side, and physically separates the third chamber 126b from the fourth chamber 128b, contacting the aqueous lithium salt solution 140b on the first side. In the fourth chamber 128b, the non-aqueous electrolyte 130b is disposed between the lithium metal layer 160b and the second side of the lithium ion-selective membrane 150b. The lithium ion selective membranes 150a, 150b allow lithium ions to pass between first chamber 126a and the second chamber 128a, and between the third chamber 126b and the fourth chamber 128b, respectively, but preclude the passage of other chemical species between the first and second chambers 126a, 128a and between the third and the fourth chambers 126b, 128b, respectively.

In manufacturing the double-sided lithium metal electrode 115 embodied in FIG. 4 using the electrolytic cell 105, a variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and third chambers 126a, 126b to the second and fourth chambers 128a, 128b, respectively, through the respective lithium ion selective membranes 150a, 150b, and into the non-aqueous electrolytes 130a, 130b, respectively, travel to the first and second faces of the conductive substrate 110, where each lithium ion gains an electron, thereby causing layers of elemental lithium 160a, 160b to be electrodeposited, respectively, on the first face and the second face of the conductive substrate 110, thereby forming the double-sided lithium metal electrode 115. During electrodeposition of the lithium metal layers 160a, 160b onto the first face and the second face of the conductive substrate 110, the conductive substrate 110 remains stationary.

In some embodiments, the first and third chambers 126a, 126b of the electrolytic cell 105 of FIG. 4 are flow chambers, with entrance ports 170a, 170b and exit ports 180a, 180b allowing aqueous lithium salt solutions 140a, 140b to enter the first chamber 126a and the third chamber 126b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 140a, 140b is selected from the group consisting of $Li_2SO_4$, $Li_2CO_3$, and combinations thereof. In preferred embodiments, the aqueous lithium salt solution 140a, 140b includes $Li_2SO_4$. In preferred embodiments, the lithium ion selective membrane 150a, 150b comprises a polymeric matrix and a plurality of ion-conducting particles disposed within the polymeric matrix. In a preferred embodiment, the lithium ion selective membrane 150*a*, 150*b* includes a glass frit with lithium ion conducting particles disposed within.

Figure 6:
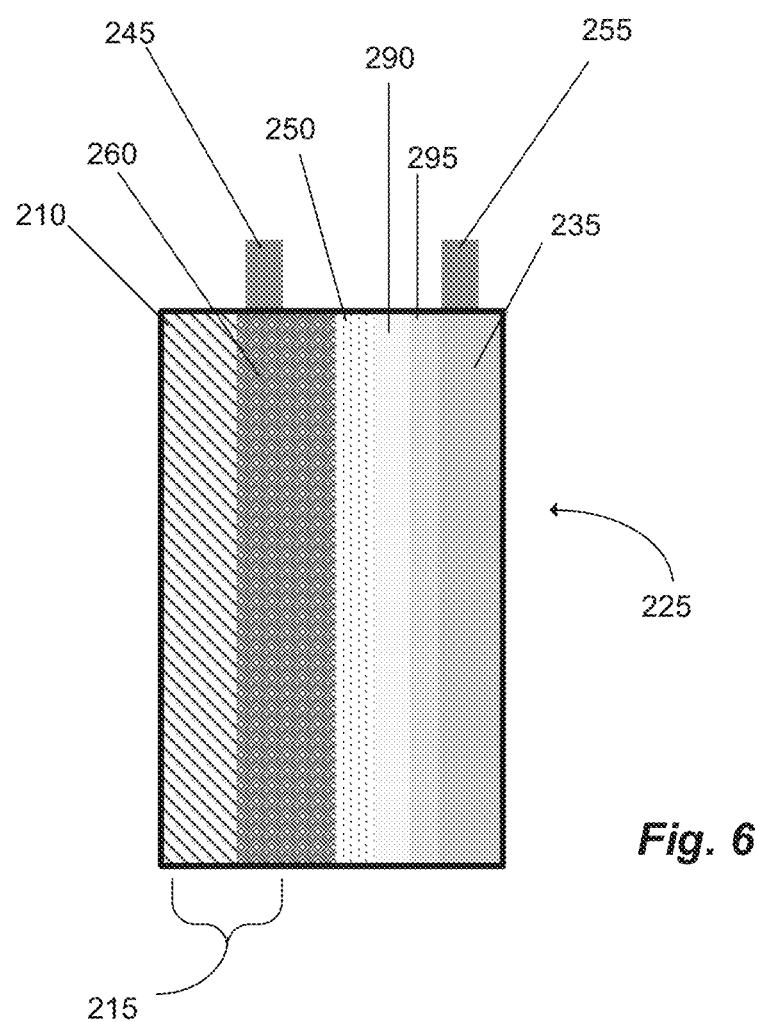
FIG. 6 shows a battery having as a working anode a single-sided lithium metal electrode, with a layer of highly pure lithium metal sandwiched between a conductive substrate and a lithium ion selective membrane, the lithium ion selective membrane configured to function as a solid state electrolyte.

FIG. 6 provides a galvanic cell 225 manufactured with a single-sided lithium metal electrode 215 configured to function as an anode. The lithium metal electrode 215 includes a conductive substrate 210, bonded to a layer of lithium metal 260, the lithium metal including no more than 5 ppm of non-metallic elements by mass. In a preferred embodiment, the lithium metal includes no more than 1 ppm of non-metallic elements by mass. In a preferred embodiment, the lithium metal includes no more than 1 ppm of nitrogen by mass. The conductive substrate 210 and the layer of lithium metal 260 together comprise the single-sided lithium metal electrode 215, of the galvanic cell 225. In a preferred embodiment, the lithium metal electrode 215 has a specific capacity of greater than about 3800 mAh per gram of lithium metal. In a preferred embodiment, the layer of lithium metal 60 has a density of between about 0.4 g/cm$^3$ and about 0.534 g/cm$^3$. In a preferred embodiment, the layer of lithium metal 260 has a density of between about 0.45 g/cm$^3$ and about 0.543 g/cm$^3$. In preferred embodiments, the conductive substrate is selected from the group consisting of copper, aluminum, graphite coated copper, and nickel. The layer of lithium metal 260 has a first face and a second face and is bonded on the first face to the conductive substrate 210 and on the second face to the lithium ion-selective membrane 250. The lithium ion-selective membrane 250, is configured to function as a solid state electrolyte. The lithium ion-selective membrane 250 separates the layer of lithium metal 260 from a catholyte 290. In preferred embodiments, the catholyte 290 includes ionic liquid-forming salts. In preferred embodiments, the catholyte 290 comprises an ionic liquid. The catholyte 290 in turn separates the lithium ion-selective membrane 250 from a cathode/catholyte interface 295, which covers a face of a cathode 235, separating the cathode 235 from the catholyte 290. Electrical contacts to the anode 245 allow electrons to flow from the electrode 215 to corresponding electrical contacts to the cathode 255, and then on to the cathode 235. In this configuration, the lithium ion-selective membrane 250 is configured to function as a solid state electrolyte. During discharge of the battery, the layer of pure lithium metal is oxidized to lithium ions, releasing electrons which flow through the electrical contacts 245, 255 from the single-sided electrode 215 to the cathode 235, and lithium ions, which flow through the lithium ion-selective membrane 250 into the catholyte 290, and into the cathode 235, where electrons are taken up. In various embodiments, the catholyte 290 can include an organic cation and an inorganic ion, comprising a salt capable of forming an ionic liquid. In embodiments, the catholyte 290 comprises an ionic liquid. In embodiments, the catholyte 290 comprises lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide (Pyr$_{14}$TFSI), trifluoromethanesulfonyl-imide, bis(trifluoromethanesulfonyl)imide (LiTFSI), and 1-ethyl-3-methylimidazolium-bis(trifluoromethylsulfonyl) imide (EMI-TFSI). In some embodiments, the catholyte 290 comprises ionic liquid-forming salts dissolved in 1,3-dioxolane (DOL), 1,2 dimethoxyethane (DME), or tetraethylene glycol dimethyl ether (TEGDME). In an embodiment, the catholyte comprises concentrated (4.0-5.0 M) lithium bis (fluorosulfonyl) imide (LiFSI) in 1:1 DOL/DME.

Without being bound by theory, it is believed that elementally pure lithium metal chemically bonded to a substrate which is then chemically bonded to a lithium ion selective membrane configured to function as a solid state electrolyte will eliminate impedance variations at the electrode/solid electrolyte separator interface, thereby minimizing dendrite formation.

Figure 7:
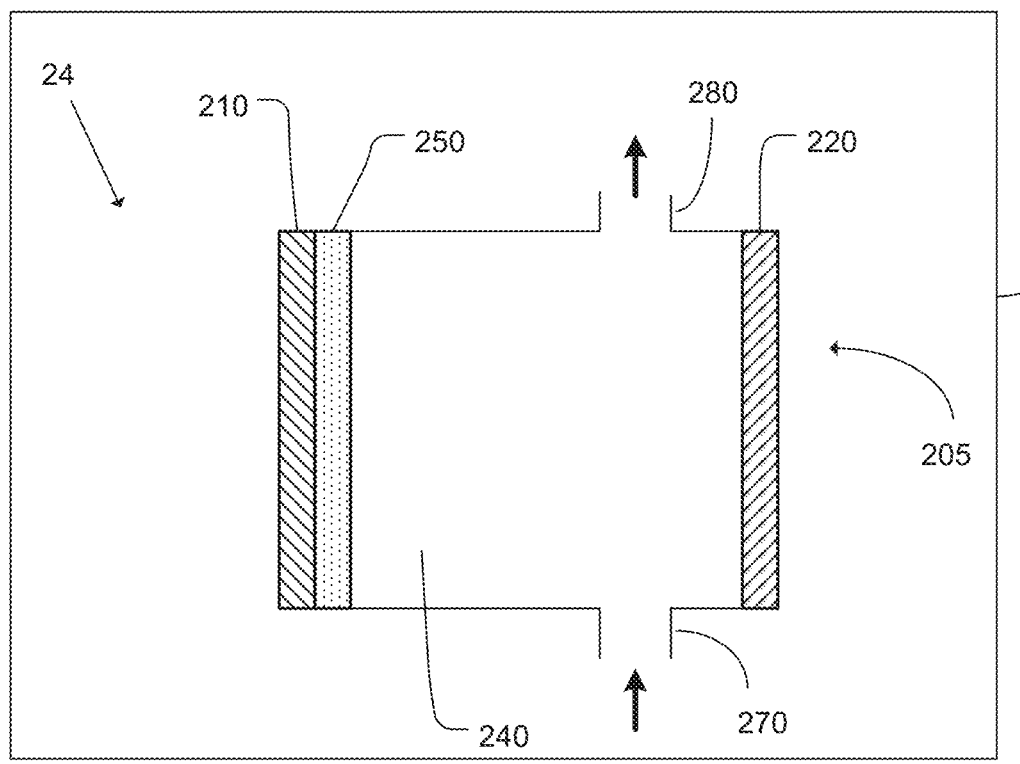
FIG. 7 shows an electrolytic cell suitable for manufacturing a single-sided lithium metal electrode as shown in FIG. 6, prior the plating of lithium metal on a conductive substrate of the cell, with a conductive substrate coated with a lithium ion selective membrane.
Figure 8:
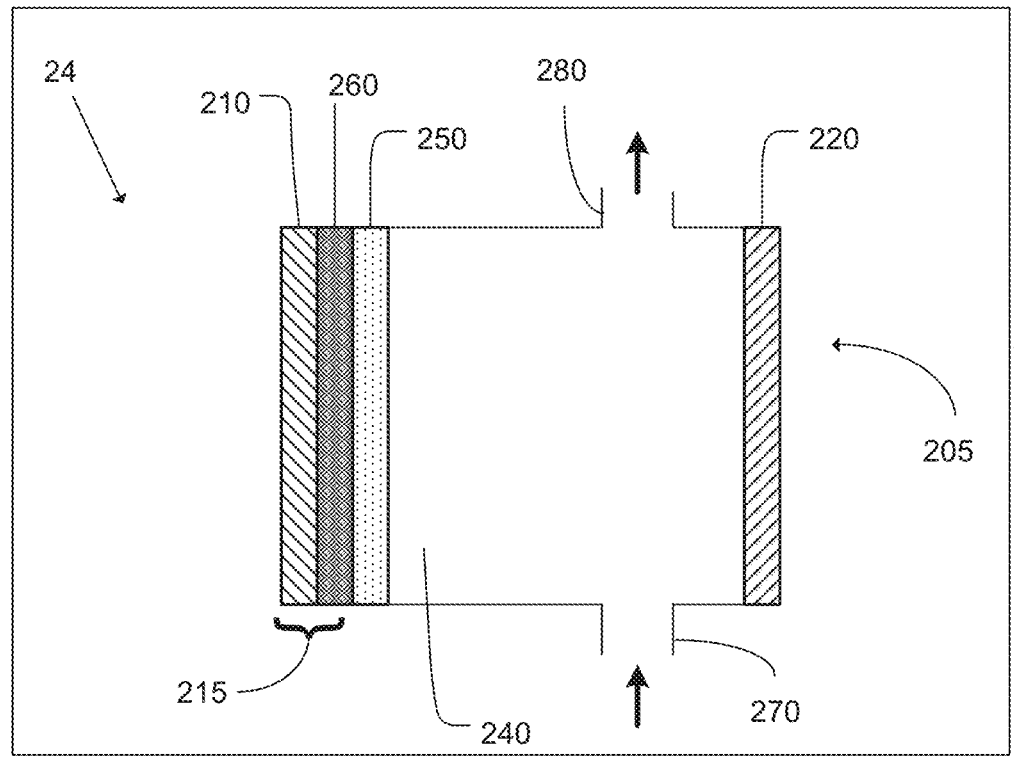
FIG. 8 shows the electrolytic cell of FIG. 7, after plating of lithium metal on the conductive substrate, the lithium metal being bonded on one side to the conductive substrate, and on the opposite side to the solid-state electrolyte, the electrode being suitable for use as a working anode in a lithium metal battery, according to an embodiment of the invention.

In a method of manufacturing by electrodeposition the single-sided lithium electrode 215 of the galvanic cell 225 of FIG. 6, an electrolytic cell 205 is used. FIG. 7 shows the electrolytic cell 205 prior to electrodeposition and FIG. 8 shows the electrolytic cell following electrodeposition. According to the method, the electrolytic cell 205 is completely blanketed with a blanketing atmosphere 24, the blanketing atmosphere being inert to chemical reaction with lithium. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 7 and 8, the blanketing atmosphere 24 and the electrolytic cell 5 are enclosed in a gas-impermeable container 500. During the process of electrodeposition, the electrolytic cell 205 is confined to the blanketing atmosphere 24.

The electrolytic cell 205 includes a conductive substrate 210, configured as a negative electrode, an ion-selective membrane 250, an aqueous lithium salt solution 240, and a positive electrode 220. The aqueous lithium salt solution 240 is interposed between the conductive substrate 210 and the positive electrode 220. Prior to electrodeposition, as shown in FIG. 7, the lithium ion selective membrane 250 covers the conductive substrate 210, and forms a barrier separating the lithium salt solution 240 and the conductive substrate 210. Prior to electrodeposition, as shown in FIG. 7, the conductive substrate 210 is physically coated with a lithium ion-selective membrane 250, configured to function as a solid state electrolyte. After electrodeposition, as shown in FIG. 8, a layer of lithium metal 260 is electrodeposited between the conductive substrate 210 and the lithium ion selective membrane 250, bonding to both the conductive substrate 210 and to the lithium ion selective membrane 250. During the process of electrodeposition, the lithium ion-selective membrane 250 separates the conductive substrate 210 and the electrodeposited lithium metal layer 260 from the lithium salt solution 240. The lithium ion selective membrane 250 is configured to function as a solid state electrolyte, allowing the passage of lithium ions from the aqueous salt solution 240 to electrodeposit onto the surface of the conductive substrate 210, but precluding the passage of other chemical species.

In manufacturing the single-sided lithium metal electrode 215 for the galvanic cell embodied in FIG. 6, a variable voltage is applied across the positive electrode 220 and the conductive substrate 210 of the electrolytic cell 205, in order to maintain a constant current, thereby causing lithium ions to move through the aqueous lithium salt solution 240, through the lithium ion-selective membrane 250, travel to the surface of the conductive substrate 210, where each lithium ion gains an electron, thereby electrodepositing a layer of elemental lithium 260 onto the conductive substrate 210, the layer of elemental lithium thus forming and bonding to the conductive substrate on a first side of the layer of elemental lithium 260 and the lithium ion-selective membrane 250 on a second side of the layer of elemental lithium 260. In this manner, as shown in FIGS. 7 and 8, the single-sided lithium metal electrode 215 is manufactured so that a sandwich of the layer of lithium metal 260 is formed between the conductive substrate 210 and the lithium ion-selective membrane 250. During the process of electrodeposition, the conductive substrate 210 is stationary in the electrolytic cell.

In some embodiments, the electrolytic cell 205 of FIG. 7 is a flow chamber, with an entrance port 270 and an exit port 280 allowing aqueous lithium salt solution 240 to enter the electrolytic cell 205 to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 240 is selected from the group consisting of $Li_2SO_4$, $Li_2CO_3$, and combinations thereof. In preferred embodiments, the aqueous lithium salt solution 240 includes $Li_2SO_4$. In preferred embodiments, the lithium ion selective membrane 250 comprises a polymeric matrix and a plurality of ion-conducting particles disposed within the polymeric matrix. In a preferred embodiment, the lithium ion selective membrane 250 includes a glass frit with lithium ion conducting particles disposed within.

In an alternative method of manufacturing by electrodeposition the single-sided lithium electrode 215 of the galvanic cell 225 of FIG. 6, the electrolytic cell 5 of FIG. 3 is used. According to this method, the lithium ion selective membrane 50 and the conductive substrate 10 both remain stationary in the electrolytic cell. A variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion selective membrane 50, into the non-aqueous electrolyte, travel to the surface of the conductive substrate 10, where each lithium ion gains an electron, thereby causing the layer of elemental lithium 60 to be electrodeposited on the conductive substrate 10. As the layer of elemental lithium 60 grows, it displaces non-aqueous electrolyte 30 from the second chamber 28, eventually coming into contact with and bonding to the lithium ion selective membrane 50, thereby forming the single-sided lithium metal electrode 215 of FIG. 6, comprising the conductive substrate 10 and the layer of lithium 60, wherein the layer of lithium 60 is bonded on one face to the conductive substrate 10 and on the other face to the lithium ion-selective membrane 50, which is configured to function as a solid state electrolyte.

Figure 9:
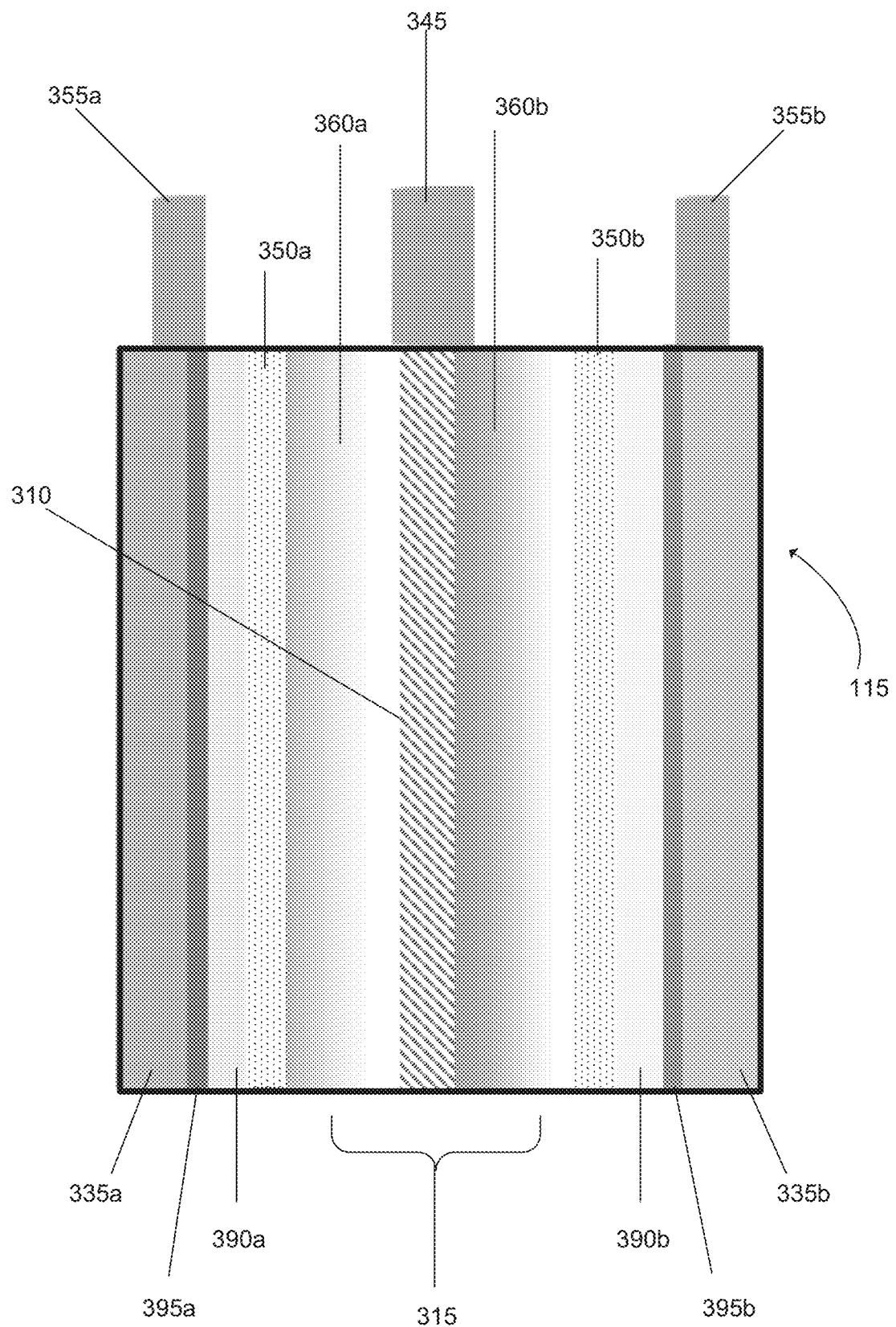
FIG. 9 shows a battery according to an embodiment of the invention, the battery having as a working anode a double-sided lithium electrode, with lithium metal sandwiched between a conductive substrate and a lithium ion selective membrane, the lithium ion selective membrane configured to function as a solid-state electrolyte.

FIG. 9 provides a galvanic cell 325 manufactured with a double-sided lithium metal electrode 315, configured to function as an anode. The double-sided lithium metal electrode 315 includes a conductive substrate 310, in the form of a plate having a first face and a second face, with the first face and the second face bonded to first and second lithium metal sheets, 360*a* and 360*b*, respectively, the lithium metal including no more than 5 ppm of non-metallic elements by mass. In a preferred embodiment, the lithium metal includes no more than 1 ppm of non-metallic elements by mass. In a preferred embodiment, the lithium metal includes no more than 1 ppm of nitrogen by mass. The conductive substrate 310 and the first and second layers of lithium metal, 360*a*, 360*b*, respectively, together comprise the double-sided lithium metal electrode 315 of the galvanic cell 325. In a preferred embodiment, the lithium metal electrode 315 has a specific capacity of greater than about 3800 mAh per gram of lithium metal. In a preferred embodiment, the first and the second layers of lithium metal 360*a*, 360*b*, each has a density of between about 0.4 g/cm$^3$ and about 0.534 g/cm$^3$. In a preferred embodiment, the layers of lithium metal 360*a*, 360*b*, each has a density of between about 0.45 g/cm$^3$ and about 0.543 g/cm$^3$. In preferred embodiments, the conductive substrate is selected from the group consisting of copper, aluminum, graphite coated copper, and nickel. Each layer of lithium metal 360*a*, 360*b* has a first face and a second face and is bonded on the first face to the conductive substrate 310 and on the second face to the lithium ion-selective membrane 350*a*, 350*b*, respectively. The lithium ion-selective membranes 350*a*, 350*b*, are configured to function as solid state electrolytes. The lithium ion-selective membrane 350*a* separates the layer of lithium metal 360*a* from a catholyte 390*a*. In preferred embodiments, the catholyte 390*a* includes ionic liquid-forming salts. In preferred embodiments, the catholyte 390*a* comprises an ionic liquid. The catholyte 390*a* in turn separates the lithium ion-selective membrane 350*a* from a cathode/catholyte interface 395*a*, which covers a face of a cathode 335*a*, separating the cathode 335*a* from the ionic liquid 390*a*. The lithium ion-selective membrane 350*b* separates the layer of lithium metal 360*b* from a catholyte 390*b*. In preferred embodiments, the catholyte 390*b* includes ionic liquid-forming salts. In preferred embodiments, the catholyte 390*b* comprises an ionic liquid. The catholyte 390*b* in turn separates the lithium ion-selective membrane 350*b* from a cathode/catholyte interface 395*b*, which covers a face of a cathode 335*b*, separating the cathode 335*b* from the ionic liquid 390*b*.

An electrical contact to the anode 345 allows electrons to flow from the electrode 315 to corresponding electrical contacts to the two cathodes 355*a*, 355*b* and then on to the cathodes 335*a*, 335*b*, respectively. During discharge of the battery, the layers of pure lithium metal 360*a*, 360*b* are oxidized to lithium ions, releasing electrons which flow through the electrical contact 345, through the electrical contacts 355*a*, 355*b* from the double-sided electrode 315 to the cathodes 335*a*, 335*b* and lithium ions, which flow through the lithium ion-selective membranes 350*a*, 350*b* into the ionic liquids 390*a*, 390*b*, and into the cathodes, 335*a*, 335*b*, where they intercalate into the cathodes 335*a*, 335*b* where electrons are taken up. In various embodiments, the catholyte can include an organic cation and an inorganic ion, comprising a salt capable of forming an ionic liquid. In various embodiments, the catholytes 390*a*, 390*b* can include an organic cation and an inorganic ion, comprising a salt capable of forming an ionic liquid. In embodiments, the catholytes 390*a*, 390*b* comprise an ionic liquid. In embodiments, the catholytes 390*a*, 390*b* comprise lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide ($Pyr_{14}TFSI$), trifluoromethanesulfonyl-imide, bis(trifluoromethanesulfonyl)imide (LiTF SI), and 1-ethyl-3-methylimidazolium-bis(trifluoromethylsulfonyl)imide (EMI-TF SI). In some embodiments, the catholytes 390a, 390b comprise ionic liquid-forming salts dissolved in 1,3-dioxolane (DOL), 1,2 dimethoxyethane (DME), or tetraethylene glycol dimethyl ether (TEGDME). In an embodiment, the catholytes 390a, 390b comprise concentrated (4.0-5.0 M) lithium bis(fluorosulfonyl) imide (LiFSI) in 1:1 DOL/DME.

Without being bound by theory, it is believed that elementally pure lithium metal chemically bonded to a substrate which is then chemically bonded to a lithium ion selective membrane configured to function as a solid state electrolyte will eliminate impedance variations at the electrode/solid electrolyte separator interface, thereby minimizing dendrite formation.

Figure 10:
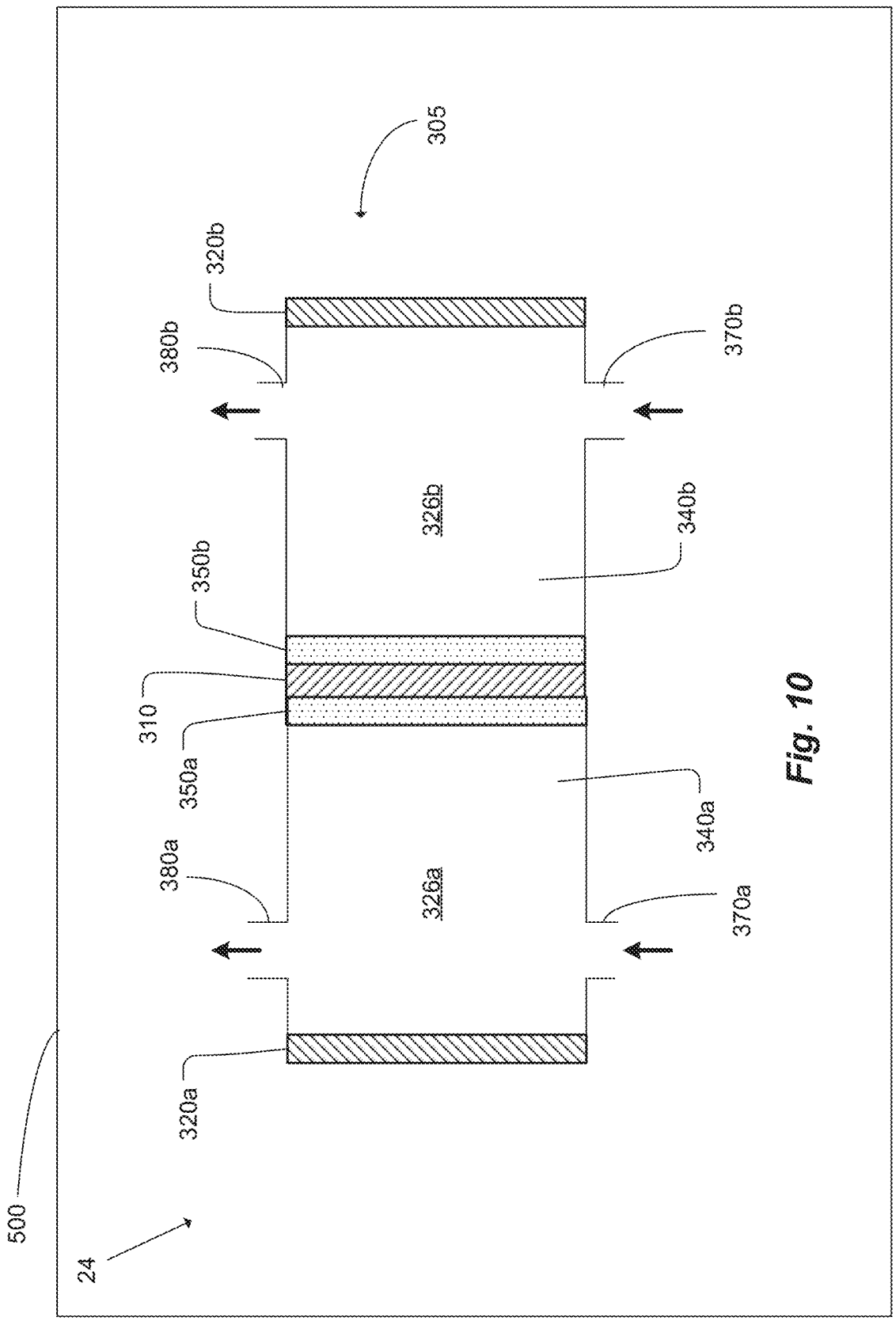
FIG. 10 shows an electrolytic cell suitable for manufacturing a double-sided lithium metal electrode of the type embodied in FIG. 9, prior to the plating of lithium metal on the two sides of the conductive substrate of the cell, wherein the conductive substrate is covered with a lithium ion selective membrane on both of its two faces.
Figure 11:
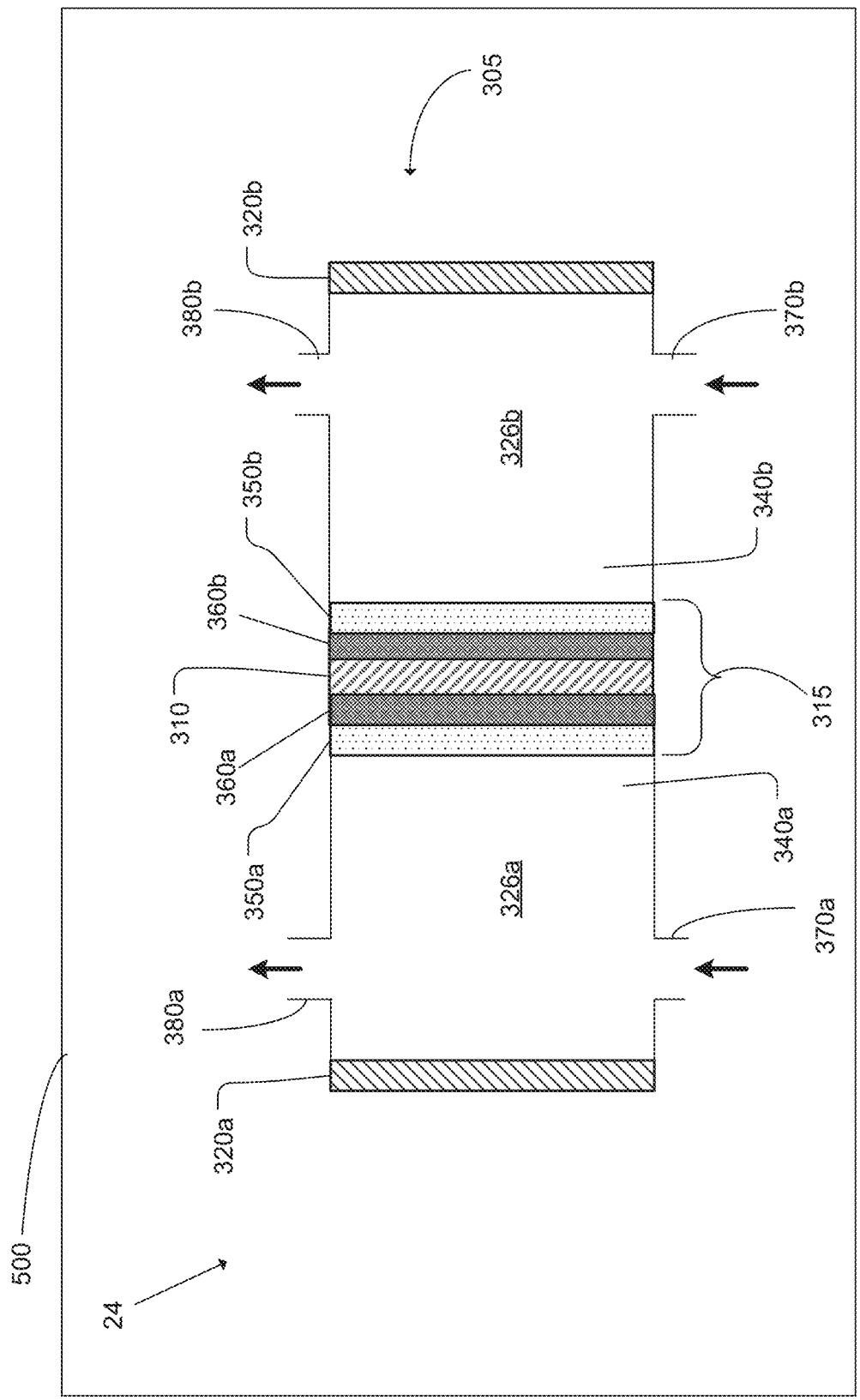
FIG. 11 shows the electrolytic cell of FIG. 10, after plating of lithium metal on each the two faces of a conductive substrate, where for each face, the lithium metal is bonded on one side to the conductive substrate, and on the opposite side to the solid-state electrolyte, the electrode being suitable for use as a working anode in a lithium metal battery, according to an embodiment of the invention.
Figure 12:
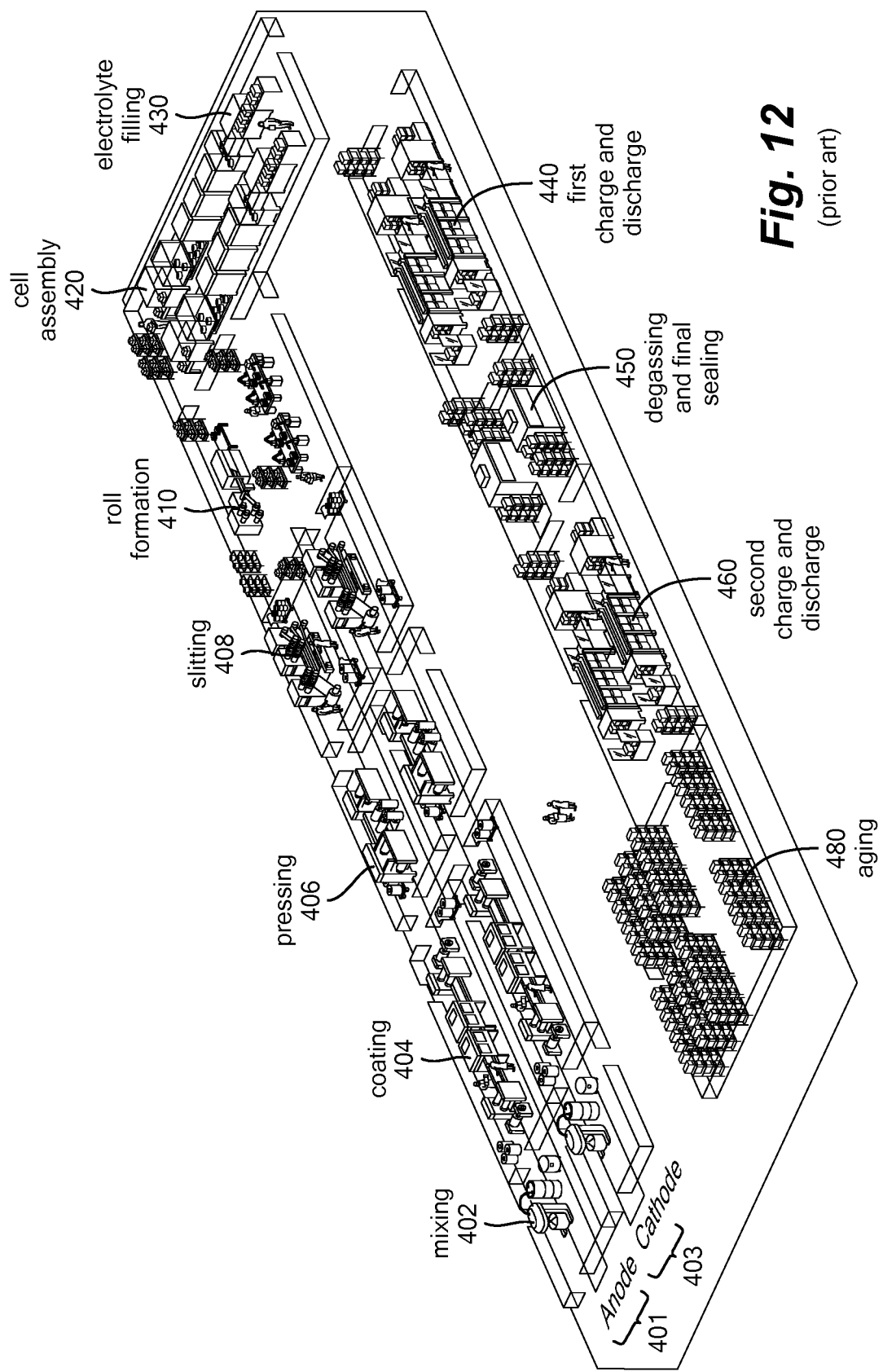
FIG. 12 shows a lithium ion battery manufacturing facility, according to Prior Art.

In a method of manufacturing by electrodeposition the double-sided lithium electrode 315 of the galvanic cell 325 of FIG. 9, an electrolytic cell 305 is used. FIG. 10 shows the electrolytic cell 305 prior to electrodeposition and FIG. 11 shows the electrolytic cell following electrodeposition. According to the method, the electrolytic cell 305 is completely blanketed with a blanketing atmosphere 24, the blanketing atmosphere being inert to chemical reaction with lithium. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 11 and 12, the blanketing atmosphere 24 and the electrolytic cell 5 are enclosed in a gas-impermeable container 500. During the process of electrodeposition, the electrolytic cell 305 is confined to the blanketing atmosphere 24.

The electrolytic cell 305 includes a first chamber 326a, and a second chamber 326b, the first chamber having a proximal end and a distal end, and the second chamber having a proximal and a distal end. Contiguous to and separating the first chamber 326a from the second chamber 326b is the conductive substrate 310, the conductive substrate 310 having a first side facing the first chamber 326a and a second side facing the second chamber 326b. Prior to electrodeposition, as embodied in FIG. 10, the first side and the second side of the conductive substrate 310 are coated with, respectively, a first lithium ion-selective membrane 350a configured to function as a solid state electrolyte, extending into the proximal end of the first chamber 326a, and a second lithium ion-selective membrane 350b, configured to function as a solid state electrolyte, extending into the proximal end of the second chamber 326b. At their distal ends, the first chamber 326a and the second chambers, 326b contain, respectively, positive electrodes 320a and 320b. The positive electrode 320a and the first lithium ion-selective membrane 350a are separated by an aqueous salt solution 340a, the aqueous salt solution 340a physically contacting both the positive electrode 320a and the lithium ion-selective membrane 350a. In a like manner, the positive electrode 320b and the first lithium ion-selective membrane 350b are separated by an aqueous salt solution 340b, the aqueous salt solution 340b physically contacting both the positive electrode 320b and the lithium ion-selective membrane 350b.

After electrodeposition, as shown in FIG. 11, layers of lithium metal, 320a, 320b, are electrodeposited between the conductive substrate 310 and the lithium ion selective membranes, 350a, 350b, respectively. the layers of lithium metal 320a, 320b, bonding to the conductive substrate 310 and the lithium ion selective membranes 350a, 350b, respectively.

During the process of electrodeposition, the lithium ion-selective membranes 350a, 350b, separate the conductive substrate 310 and the electrodeposited lithium metal layers 360a, 360b, respectively, from the lithium salt solutions 340a, 340b.

The lithium ion-selective membranes 350a, 350b are configured function as solid state electrolytes, allowing lithium ions to pass between the aqueous lithium salt solutions 340a, 340b, and the conductive substrate 310, but preventing the passage of other chemical species.

In manufacturing the double-sided lithium metal electrode 315 for the galvanic cell embodied in FIG. 9, a variable voltage is applied across the positive electrodes 320a, 320b and the conductive substrate 310 of the electrolytic cell 305, in order to maintain a constant current, thereby causing lithium ions to move through the aqueous lithium salt solutions 340a, 340b, respectively, through the lithium ion-selective membranes 350a, 350b, respectively, travel to the surface of the conductive substrate 310, where each lithium ion gains an electron, thereby electrodepositing the layers of elemental lithium 360a, 360b onto the first side and the second side, respectively, of the conductive substrate 310, the layers of elemental lithium 360a, 360b thus forming and bonding to the conductive substrate 310 and, respectively, to the lithium ion-selective membranes 350a, 350b. In this manner, as shown in FIGS. 10 and 11, the double-sided lithium metal electrode 315 is manufactured as a sandwich with a central conductive substrate 310 bounded on opposite sides by layers of elemental lithium 360s, 360b, the layers of elemental lithium 360a, 360b in turn bounded by layers of lithium ion-selective membrane 350a, 350b. During the process of electrodeposition, the conductive substrate 310 is stationary in the electrolytic cell.

In some embodiments, the first and second chambers 326a, 326b of the electrolytic cell 305 of FIGS. 10 and 11 are flow chambers, with entrance ports 370a, 370b and exit ports 380a, 380b allowing aqueous lithium salt solutions 340a, 340b to enter the first chamber 326a and the second chamber 326b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 340a, 340b is selected from the group consisting of $Li_2SO_4$, $Li_2CO_3$, and combinations thereof. In preferred embodiments, the aqueous lithium salt solution 340a, 340b includes $Li_2SO_4$. In preferred embodiments, the lithium ion selective membrane 350a, 350b comprises a polymeric matrix and a plurality of ion-conducting particles disposed within the polymeric matrix. In a preferred embodiment, the lithium ion selective membrane 350a, 350b includes a glass frit with lithium ion conducting particles disposed within.

In an alternative method of manufacturing by electrodeposition the double-sided lithium electrode 315 of the galvanic cell 325 of FIG. 9, the electrolytic cell 105 of FIG. 5 is used. According to this method, the lithium ion selective membranes 150a, 150b and the conductive substrate 110 each remain stationary in the electrolytic cell. A variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and fourth chambers 126a, 126b to the second and third chambers 128a, 128b, respectively, through the lithium ion selective membranes 150a, 150b, into the non-aqueous electrolytes 130a, 130b, travel to the first and the second faces of the conductive substrate 110, where each lithium ion gains an electron, thereby causing layers of elemental lithium 160a, 160b to be electrodeposited on the conductive substrate 110. As the layers of elemental lithium 160a, 160b grow, they displace non-aqueous electrolytes 130a, 130b from the second and third chambers 128a, 128b, respectively, eventually coming into contact with and bonding to the lithium ion selective membranes 150a, 150b, thereby forming the double-sided lithium metal electrode 315 of FIG. 9, comprising the conductive substrate 110 and the layers of lithium 160a, 160b, wherein the layers of lithium 160a, 160b are bonded, respectively on the first and second faces of the conductive substrate 110 and to the lithium ion-selective membranes 150a, 150b, wherein the lithium ion-selective membranes 150a, 150b, are configured to function as solid state electrolytes.

In preferred embodiments, the lithium metal electrodes described herein can be integrated into batteries, including but not limited to the batteries embodied in FIGS. 6 and 9.

The methods described above are well-suited for vertically integrated battery production, thereby allowing for a supply chain for LMB production that is regionally controlled in any region where lithium is mined (for example, in the US). The development of such a local regional supply chain greatly reduces costs, and provides LMBs that are inherently cobalt free.

A typical fabrication facility for lithium ion batteries according to the prior art is shown in FIG. 12. Manufacturing stages involve fabrication of anodes 401 and cathodes 403, cell assembly and cell finishing and testing. Anodes 401 and cathodes 403 follow parallel tracks involving mixing 402 to form a slurry, coating 404 onto conductive foil, pressing 406 to bond coating to foil, and slitting 408 to form desired electrode dimensions. Following roll formation 410, cells are assembled 420, filled with electrolyte and sealed 430. Because LIB cells are manufactured in a fully discharged state, the final stage of the process involves cell finishing, a time-consuming that may include steps of charge and discharge 440, degassing and final sealing 450, further charge and discharge 460 and finally aging 480. Because of the multiple, time-consuming steps, the finishing process can take between 20-30 days.

According to the embodiments described above, lithium metal electrodes can be fabricated in situ, thereby providing lithium metal anodes for LMBs in a fully charged state. According to the embodiment of FIG. 13, the processes described above for lithium metal anode fabrication can be vertically integrated into a cost- and energy-efficient manufacturing method for LMBs. As embodied in FIG. 13, the cathode 403 is still manufactured by conventional methods involving mixing 402, coating 404, and pressing 406. However, the working anode is now formed by electrolysis 405 according to the process embodied in FIG. 1, involving blanketing an electrolytic cell with a blanketing atmosphere 2, applying constant current to the cell 4, flowing Li$^+$ across a lithium selective membrane 6, reducing Li$^+$ to Li metal 8, and fabricating a Li metal battery 12, by steps involving pouch formation 412, cell assembly 420, cell filling and sealing 430, and finishing steps 490. Cell assembly 420 includes the steps of assembling a casing with contents including the working anode, and other components to form a lithium metal battery, and sealing the casing to isolate the contents from reactants present in the air.

Figure 13:
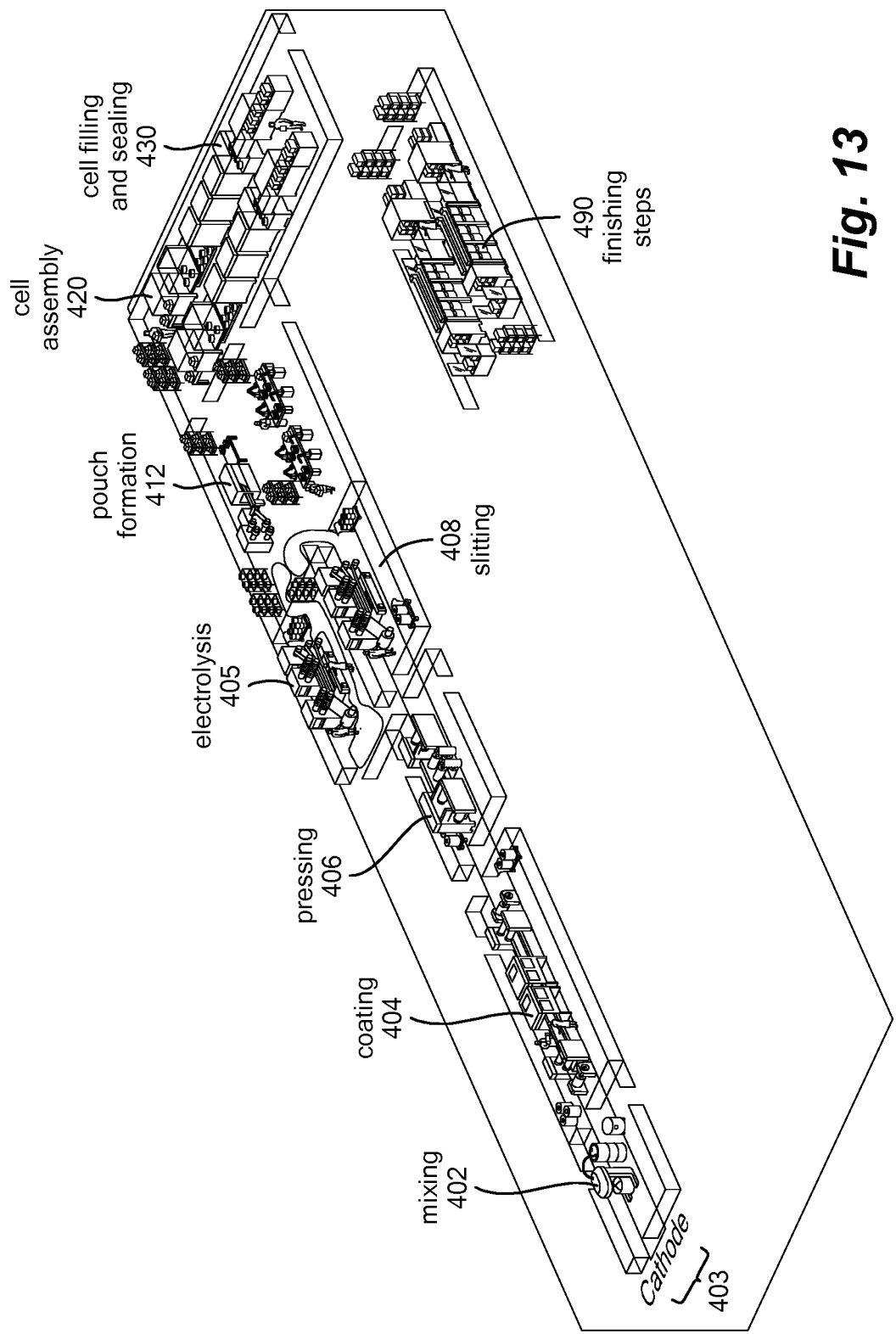
FIG. 13 shows a vertically integrated lithium metal battery manufacturing facility with manufacturing as embodied in the methods described in the current application.

As embodied in FIG. 13, LMB manufacture according to the current invention is a vertically integrated process that replaces the anode fabrication process by an in situ low-temperature electrodeposition process, utilizing as feedstock an aqueous lithium salt solution, where the electrodeposition occurs through a lithium ion selective membrane to produce a highly pure lithium metal anode, resistant to dendrite formation. Because lithium metal negative electrodes are fabricated in a fully charged state, the lengthy formation process required for lithium ion batteries is not required.

Because of the use of the lithium ion selective membrane, and the high current densities, a relatively inexpensive impure feed such as $Li_2SO_4$ can be used for electrodeposition, saving energy and reducing costs. Impurities in the lithium metal anodes are further reduced by performing the electrodeposition entirely in a blanketing atmosphere, substantially depleted of lithium reactive components including nitrogen, oxygen, ozone, oxides of nitrogen, sulfur and phosphorous, carbon dioxide, halogens, hydrogen halides, and water. In preferred embodiments, the inert atmosphere is purified argon gas. In some embodiments, steps following electrodeposition, including cell assembly, electrolyte/cell filling and sealing are also performed in the inert atmosphere. In other embodiments, only the lithium electrodeposition occurs under inert atmosphere, with remainder of battery manufacturing processes taking place in "dry air," where dry air refers to air with less than 1% RH (relative humidity) (−45° C. dew point). In preferred embodiments, during LMB manufacture the temperature is kept between about 20° C. and about 30° C. In preferred embodiments, during LMB manufacture the temperature is kept between about 23° C. and about 27° C.

Figure 14:
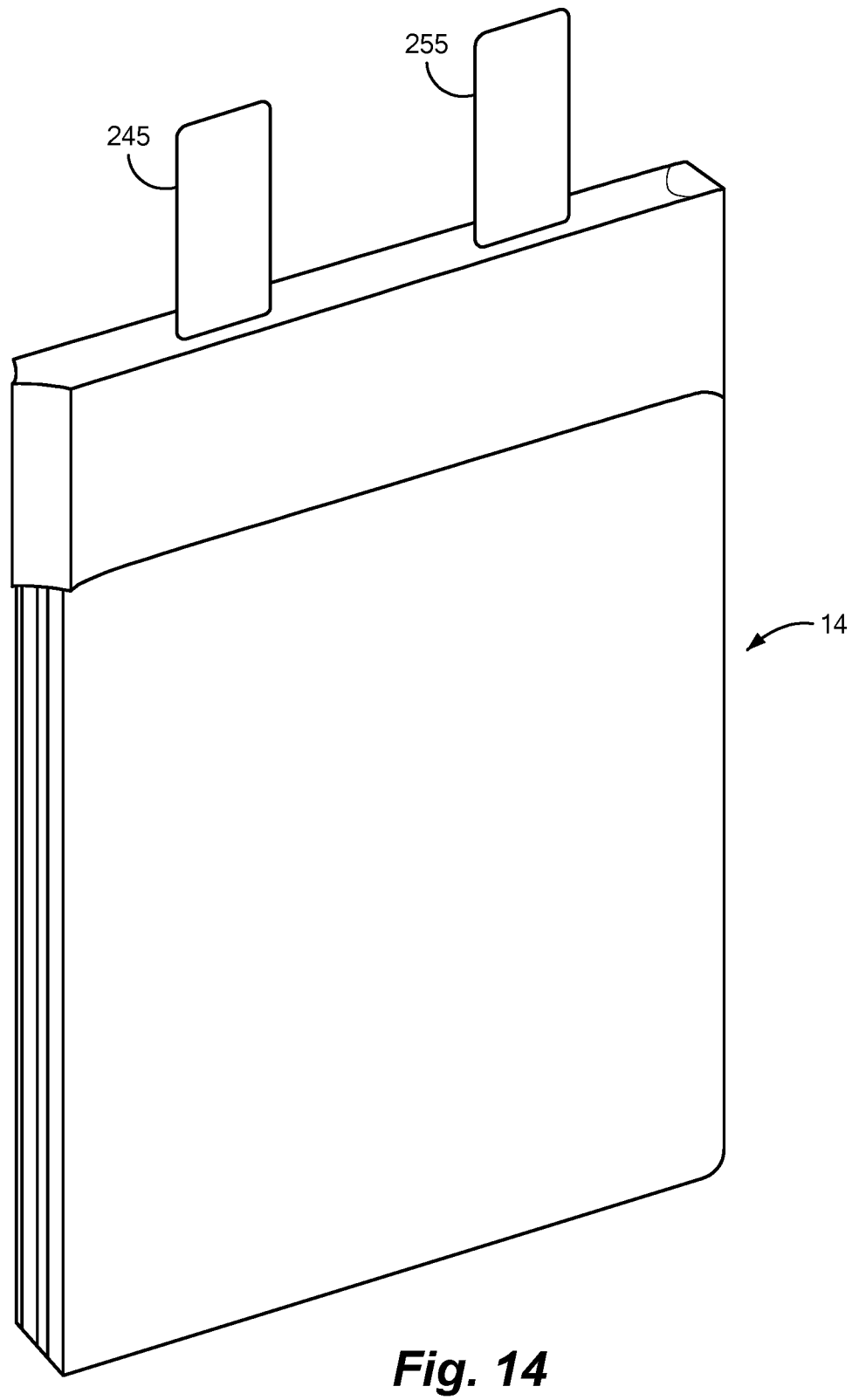
FIG. 14 shows a battery case for a battery with a single-sided lithium anode according to embodiments of the invention.
Figure 15:
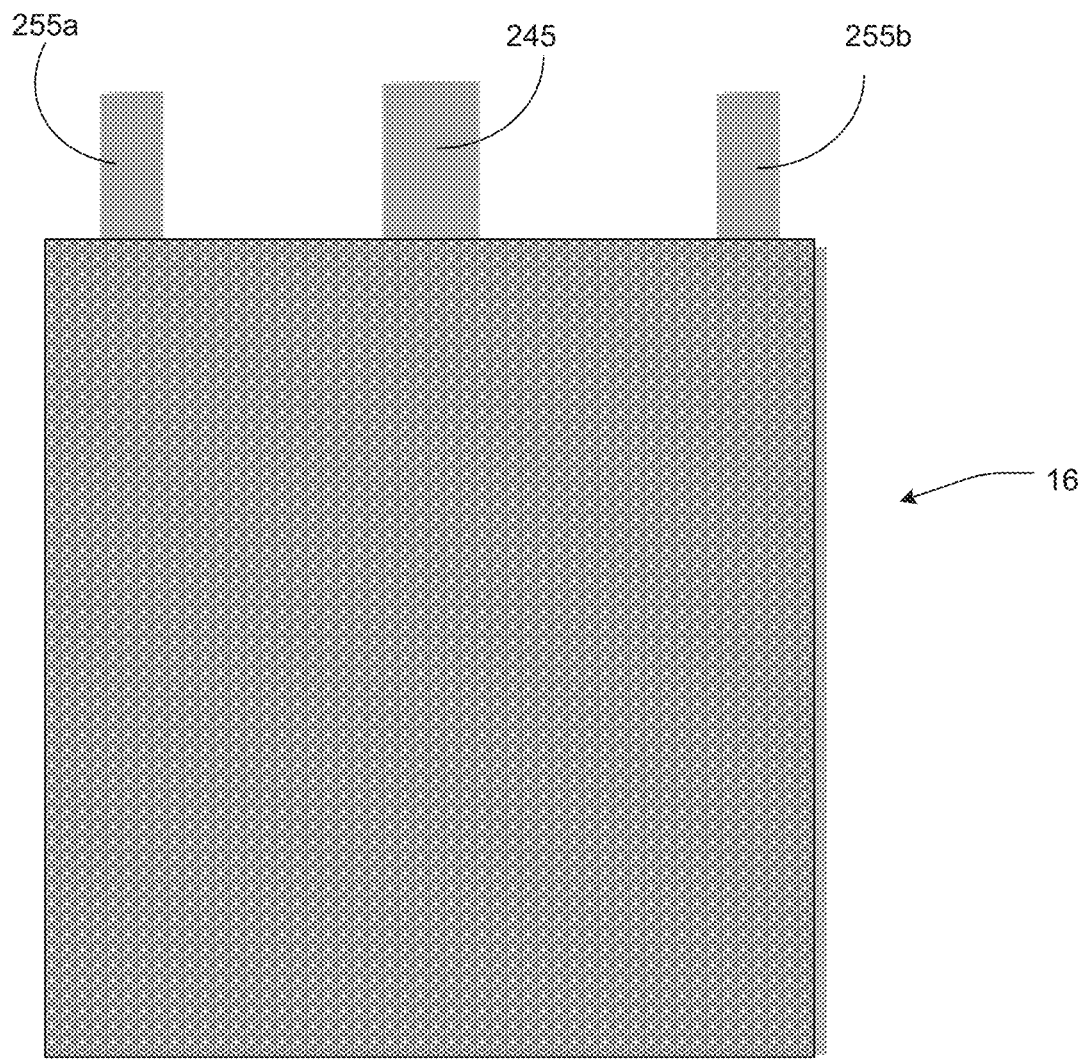
FIG. 15 shows a battery case for a battery with a double-sided lithium anode according to embodiments of the invention.

A variety of different LMB battery configurations are understood to be encompassed by the invention described above. FIG. 14 embodies a single-cell battery configuration 14, shown as manufactured with a battery case, showing electrical contacts to the anode 245 and to the cathode 255. FIG. 15 embodies a double-cell battery configuration 16, as manufactured with a battery case, showing a single electrical contact to the anode 245, and two electrical contacts 255a, 255b, to the cathode.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of manufacturing a lithium electrode, comprising:
    (1) providing an electrolytic cell, the electrolytic cell including:
        a first chamber containing a positive electrode, and an aqueous lithium salt solution in contact with the positive electrode;
        a second chamber containing a conductive substrate configured as a negative electrode, the conductive substrate being stationary in the chamber during lithium metal electrodeposition, a lithium ion selective membrane separating the first chamber from the second chamber, and a non-aqueous electrolyte disposed between the conductive substrate and the lithium ion selective membrane, physically contacting both the conductive substrate and the lithium ion selective membrane;

the electrolytic cell being configured to allow passage of lithium ions through the lithium ion selective membrane between the first and the second chambers, and to preclude passage of other chemical species between the first and the second chambers;

(2) blanketing the electrolytic cell with a blanketing atmosphere, the blanketing atmosphere being substantially free of lithium reactive components; and (3) applying a variable voltage in order to maintain a constant current across the negative electrode and the positive electrode, thereby causing lithium ions to cross from the first chamber to the second chamber, through the lithium ion selective membrane and the non-aqueous electrolyte, and electrodeposit a first layer of lithium onto the conductive substrate, thereby forming the lithium electrode, the first layer of lithium being devoid of nanorods and having an inner face and an outer face, the inner face of the first layer of lithium bonded to the conductive substrate;

wherein the constant current is between about 10 mA/cm$^2$ and about 50 mA/cm$^2$, and wherein the constant current is applied for a time between about 1 minute and about 60 minutes;

wherein as the first layer of lithium is formed, the first layer of lithium displaces non-aqueous electrolyte from a space between the conductive substrate and the lithium ion-selective membrane, thereby bonding the inner face of first layer of lithium to the conductive substrate and the outer face of the first layer of lithium to the ion selective membrane, thereby forming a lithium metal electrode comprising the conductive substrate and the first layer of lithium metal, with the inner face of the first layer of lithium bonded to the conductive substrate, and the outer face of the first layer of lithium bonded to the lithium ion-selective membrane, which is configured to function as a solid state electrolyte when the lithium metal electrode is incorporated into a galvanic cell.

2. The method according to claim 1, wherein the blanketing atmosphere includes no more than 10 ppm of lithium reactive components on a molar basis.

3. The method according to claim 1, wherein the blanketing atmosphere includes no more than 10 ppm nitrogen on a molar basis.

4. The method according to claim 1, wherein the blanketing atmosphere includes no more than 5 ppm nitrogen on a molar basis.

5. The method according to claim 1, wherein the conductive substrate comprises a plate having a first face and a second face, wherein the inner face of the first layer of lithium metal bonds to the first face of the conductive substrate.

6. The method according to claim 1, wherein the aqueous lithium salt solution comprises a lithium salt selected from the group consisting of $Li_2SO_4$, $Li_2CO_3$, and combinations thereof.

7. The method according to claim 1, wherein the aqueous lithium salt solution includes $Li_2SO_4$.

8. The method according to claim 1, wherein the conductive substrate is selected from a group consisting of copper, aluminum, graphite coated copper, and nickel.

9. The method according to claim 1, wherein the lithium ion selective membrane comprises a polymeric matrix and a plurality of ion-conducting particles disposed within the polymeric matrix.

10. The method according to claim 1, wherein the lithium ion selective membrane comprises a glass frit with lithium ion conducting particles disposed within.

11. The method according to claim 1, wherein the atmosphere comprises argon with a purity of greater than 99.998 weight percent.

12. The method according to claim 1, wherein the lithium electrode has a specific capacity of greater than about 3800 mAh per gram of lithium.

13. A method of manufacturing a lithium metal battery, comprising:

manufacturing a lithium electrode according to the method of claim 1;

assembling a casing with contents including a cathode, an electrolyte, a separator and the lithium electrode configured as an anode; and sealing the casing to isolate the contents of the casing from reactants present in air, thereby providing the lithium metal battery.

14. The method of manufacturing according to claim 13, the method being performed in a single manufacturing facility.

15. The method according to claim 1, wherein the lithium ion selective membrane is stationary in the electrolytic cell.

16. The method of manufacturing according to claim 1, wherein the constant current is between about 25 mA/cm$^2$ and about 50 mA/cm$^2$.

* * * * *

UNITED STATES PATENT AND TRADEMARK OFFICE
CERTIFICATE OF CORRECTION

| | |
|---|---|
| PATENT NO. | : 12,027,691 B2 |
| APPLICATION NO. | : 17/006073 |
| DATED | : July 2, 2024 |
| INVENTOR(S) | : Emilie Bodoin |

It is certified that error appears in the above-identified patent and that said Letters Patent is hereby corrected as shown below:

In the Claims

Column 23, Line 31, Claim 1, "layer of lithium displaces non-aqueous electrolyte from" should read --layer of lithium displaces the non-aqueous electrolyte from--

Column 23, Line 33, Claim 1, "lithium ion-selective membrane, thereby bonding the" should read --lithium ion selective membrane, thereby bonding the--

Column 23, Line 34, Claim 1, "inner face of first layer of lithium to the conductive" should read --inner face of the first layer of lithium to the conductive--

Column 23, Line 41, Claim 1, "lithium bonded to the lithium ion-selective membrane," should read --lithium bonded to the lithium ion selective membrane,--

Signed and Sealed this
Fifteenth Day of October, 2024

Katherine Kelly Vidal
*Director of the United States Patent and Trademark Office*